US012754523B2

(12) United States Patent
Guerrero et al.

(10) Patent No.: US 12,754,523 B2
(45) Date of Patent: Oct. 6, 2026

(54) CONFIGURATION AND DEPLOYMENT OF A BUILDING CONTROL SYSTEM

(71) Applicant: Crestron Electronics, Inc., Rockleigh, NJ (US)

(72) Inventors: Leonardo Guerrero, Yonkers, NY (US); Konstantinos Skontrianos, New Providence, NJ (US); Heath Blash, Nyack, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 903 days.

(21) Appl. No.: 18/057,543

(22) Filed: Nov. 21, 2022

(65) Prior Publication Data

US 2023/0161307 A1 May 25, 2023

Related U.S. Application Data

(60) Provisional application No. 63/281,769, filed on Nov. 22, 2021.

(51) Int. Cl.
*G05B 19/02* (2006.01)

(52) U.S. Cl.
CPC .......... *G05B 19/02* (2013.01); *G05B 2219/20* (2013.01)

(58) Field of Classification Search
CPC .... G05B 19/02; G05B 2219/20; G05B 15/02; G05B 2219/2642; H04L 12/12
See application file for complete search history.

(56) References Cited

U.S. PATENT DOCUMENTS

| | | | | |
|---|---|---|---|---|
| 2015/0198938 | A1* | 7/2015 | Steele | B25J 9/1689 700/275 |
| 2017/0279630 | A1* | 9/2017 | Anderson | G05B 19/042 |
| 2018/0220513 | A1* | 8/2018 | Ackmann | H05B 47/115 |
| 2019/0190741 | A1* | 6/2019 | Wendt | H05B 47/19 |
| 2019/0363933 | A1* | 11/2019 | Morley | H04W 24/02 |
| 2020/0287786 | A1* | 9/2020 | Anderson | H04W 8/005 |
| 2021/0270488 | A1* | 9/2021 | Salunke | G05B 19/4185 |

* cited by examiner

*Primary Examiner* — Kenneth M Lo
*Assistant Examiner* — Mohammed Shafayet
(74) *Attorney, Agent, or Firm* — Crestron Electronics, Inc.

(57) ABSTRACT

A building control system for configuring and deploying electronic devices installed in a building comprising a plurality of space control systems. Each space control system comprises a plurality of electronic devices adapted to communicate via a network to control at least one load installed in the space and a memory that stores device data comprising a unique identifier that uniquely identifies the electronic device within the building control system associated with a device identifier that references the electronic device within the space control system. The electronic devices of one space control system can be configured by assigning at least one setting to at least one device identifier. A template can be created comprising the device identifiers and associated settings of the one of the space control systems. The template can be applied another space control system by applying the settings in the template to electronic devices with matched device identifiers.

24 Claims, 19 Drawing Sheets

CONFIGURATION AND DEPLOYMENT OF A BUILDING CONTROL SYSTEM

BACKGROUND OF THE INVENTION

Technical Field

Aspects of the embodiments relate to building control systems, and more specifically to a system and method for configuring and deploying a building control system.

Background Art

Building automation and management are ever evolving to provide consumers with convenient and simple control and monitoring of various mechanical and electrical equipment within a building through building control systems, also known as building management systems and energy management systems. Building control systems provide comfort, convenience, simplicity and security, as well as lower energy costs. They generally utilize a network of sensors and control devices distributed throughout a residential or commercial building to control and provide information on the mechanical and electrical equipment within the building. The system can control and monitor heating, ventilation and air conditioning (HVAC), lighting, shading, security, appliances, door locks, and audiovisual (AV) equipment, among others, for every room in each facility.

Building control systems are implemented in buildings of varying degrees of complexity. In large scale buildings there may be thousands of devices dispersed in hundreds of rooms. Building control systems utilize complicated software to configure the behavior of each controllable device within the building to setup all of their aspects and parameters, which includes naming devices, pairing devices, and setting presets, climate set points, lighting levels, lighting scenes, shade levels, optimized sensor settings, or the like. Often configuration of a building control system is a manual and time-consuming process that requires the programmer to walk into each room within the building and configure each device individually. In addition, the programming software to set up a building management system can be very confusing, difficult to interpret, and not intuitive to use.

Accordingly, a need has arisen for a building control system and method that allow a user to rapidly configure and deploy configurations to plurality of building control devices.

SUMMARY OF THE INVENTION

It is an object of the embodiments to substantially solve at least the problems and/or disadvantages discussed above, and to provide at least one or more of the advantages described below.

It is therefore a general aspect of the embodiments to provide a system, method, and modes for configuring and deploying a building control system.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of the Invention

According to one aspect of the embodiments, a building control system is provided for configuring and deploying electronic devices installed in a building. The system comprises a space control system adapted to be installed in a space located within the building comprising: a plurality of electronic devices; and a load controller adapted communicate with the plurality of electronic devices via a space network to control an operation of at least one load installed in the space, wherein for each of the electronic devices the load controller stores device data comprises a unique identifier that uniquely identifies the electronic device within the space control system. The system further comprises at least one memory that stores a plurality of templates each template comprising a plurality of template identifiers each associated with at least one setting; and at least one processor adapted to: associate each of a plurality of device identifiers with one of the unique identifiers of the plurality of electronic devices; compare the device identifiers with template identifiers of a template selected from the plurality of templates; and for a device identifier that matches a template identifier of the selected template, deploy the at least one setting associated with the matched template identifier to the space control system to control the electronic device associated with the matched device identifier according to the deployed setting.

According to an embodiment, the at least one processor is further adapted to receive the device data from the load controller. The at least one processor may be further adapted to receive a command to apply the selected template to the space control system. The command may be received from a user interface. According to another embodiment, the at least one processor is further adapted to transmit the deployed setting and the matched device identifier to the load controller. The load controller may associate the deployed setting with a unique identifier of an electronic device associated with the matched device identifier. According to an embodiment, the at least one processor associates the deployed setting with a unique identifier of an electronic device associated with the matched device identifier.

According to an embodiment, the device data further comprises a device type adapted to represent at least one capability of an electronic device, and wherein each template further comprises a device type associated with each template identifier, and wherein the at least one processor is further adapted to: compare the device types in the device data with the device types in the selected template; wherein the at least one processor compares the device identifiers with template identifiers of the selected template of only matched device types. According to an embodiment, each template further comprises at least one inter-device relationship associated with at least two device identifiers, and wherein the at least one processor is further adapted to: for at least two device identifiers that match two template identifiers, deploy the at least one inter-device relationship associated with the matched two device identifiers to the space control system.

According to an embodiment, controlling the operation of the at least one load installed in the space changes at least one environmental condition in the building. The load may comprise at least one of a lighting device, a power device, a heating device, a ventilation device, an air conditioning device, a motorized shading device, a security device, an appliance, a door lock, an audiovisual device, an industrial device, and any combinations thereof. The plurality of electronic devices may comprise at least one of a control device, a user interface, a touch screen, a keypad, a switch, a dimmer, a control panel, an occupancy sensor, a light sensor, a relay, and any combinations thereof.

According to an embodiment, the space network may comprise one of a wireless network, a wired network, and any combinations thereof. According to another embodiment, the building control system further comprises a plurality of the space control systems and a control processor adapted to communicate with the space control systems via a centralized network. The centralized network may comprise one of a wireless network, a wired network, and any combinations thereof. The at least one processor may be further adapted to create a template of the plurality of templates by retrieving template identifiers and associated settings from one of the space control systems. The at least one processor may be adapted to deploy one or more of the templates to one or more of the plurality of the space control systems. According to one embodiment, the control processor comprises the at least one processor. According to another embodiment, a remote server may comprise the at least one processor. According to yet another embodiment, a user communication device comprises the at least one processor and a building control application. The user communication device may be adapted to communicate with at least one of the space control system and the building control system via the building control application. The user communication device may be adapted to communicate with the load controller via a short range communication.

According to an embodiment, the at least one setting may be selected from at least one of a dimming level, a dimming curve, a timeout period, a lighting scene, a sensor sensitivity setting, an on/off operation, a switch parameter, a calibration data, a fade rate, a fade time, and any combinations thereof.

According to another aspect of the embodiments, a building control system is provided for configuring and deploying electronic devices installed in a building. The system comprises a plurality of space control systems installed in spaces located within the building, each space control system comprising: a plurality of electronic devices adapted to communicate via a space network to control an operation of at least one load installed in the space, wherein each electronic device is associated with a unique identification number that uniquely identifies the electronic device. The system further comprises at least one memory that stores a plurality of templates each template comprising a plurality of template identifiers each associated with at least one setting; and at least one processor, wherein for at least one of the space control systems the at least one processor is adapted to: associate each of a plurality of device identifiers with one of the unique identifiers of the plurality of electronic devices; compare the device identifiers with template identifiers of a template selected from the plurality of templates; and for a device identifier that matches a template identifier of the selected template, deploy the at least one setting associated with the matched template identifier to the at least one space control system to control the electronic device associated with the matched device identifier according to the deployed setting.

According to another aspect of the embodiments, a building control system is provided for configuring and deploying electronic devices installed in a building. The system comprises a plurality of space control systems installed in spaces located within the building, each space control system comprising: a plurality of electronic devices adapted to communicate via a space network to control at least one load installed in the space; and a memory that stores device data comprising a unique identifier that uniquely identifies the electronic device within the building control system associated with a device identifier that references the electronic device within the space control system. The system further comprises at least one processor adapted to: assign at least one setting to at least one device identifier of one of the space control systems; create a template comprising the device identifiers and associated settings of the one of the space control systems; and apply the template to another one of the space control systems by applying at least one of the settings in the template to electronic devices with matched device identifiers.

According to another aspect of the embodiments, a building control system is provided for configuring and deploying electronic devices installed in a building. The system comprises a plurality of space control systems installed in spaces located within the building, each space control system comprising: a plurality of electronic devices adapted to communicate via a space network to control at least one load installed in the space; and a memory that stores device data comprising a unique identifier that uniquely identifies the electronic device within the building control system associated with a device identifier that references the electronic device within the space control system. The system further comprises at least one processor adapted to: assign at least one inter-device relationship to at least two device identifiers of one of the space control systems; create a template comprising the device identifiers and associated at least one inter-device relationship of the one of the space control systems; and apply the template to another one of the space control systems by applying the at least one inter-device relationship in the template to electronic devices with matched device identifiers.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
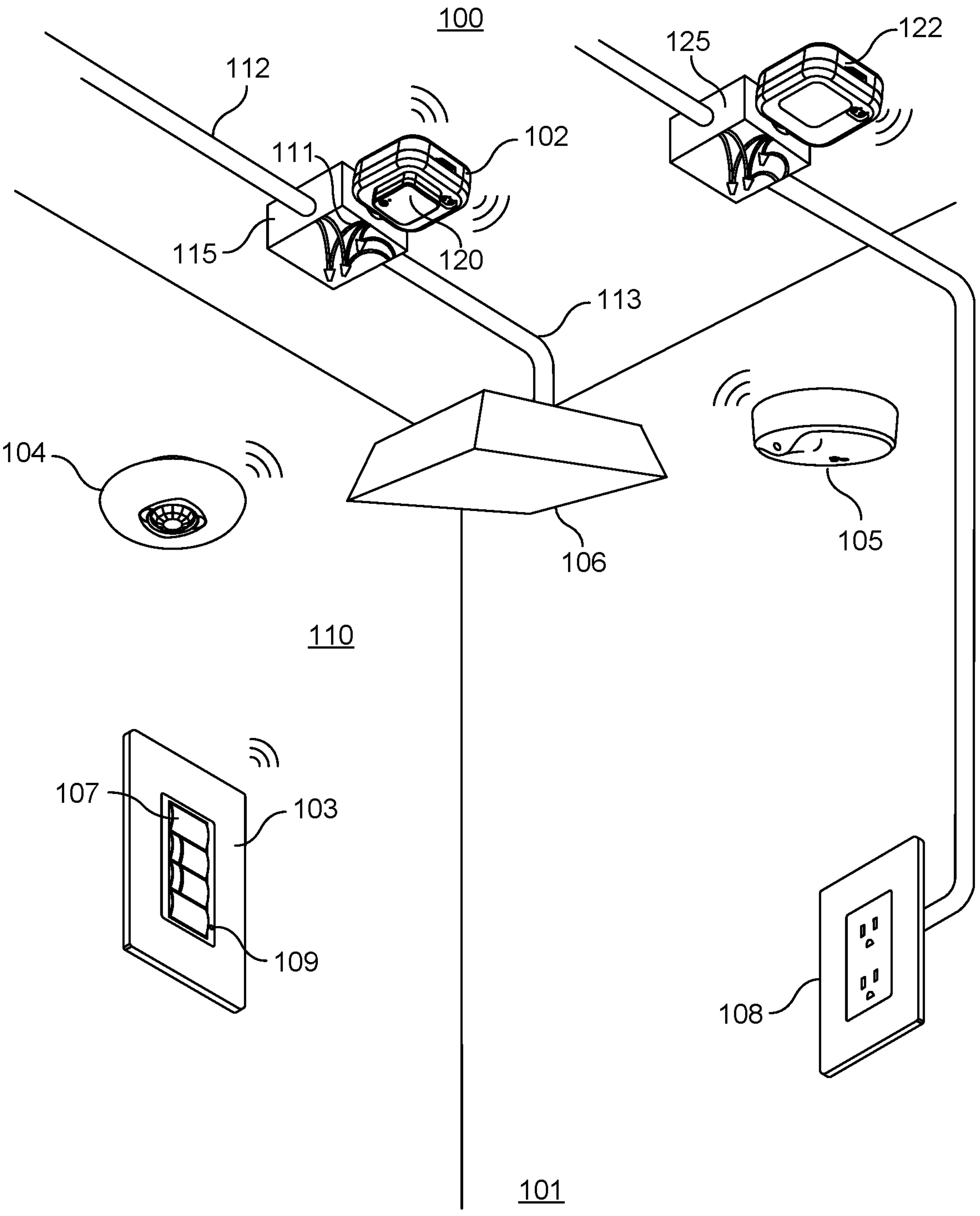

FIG. 1 illustrates a room control system according to an illustrative aspect of the embodiments.

Figure 2:
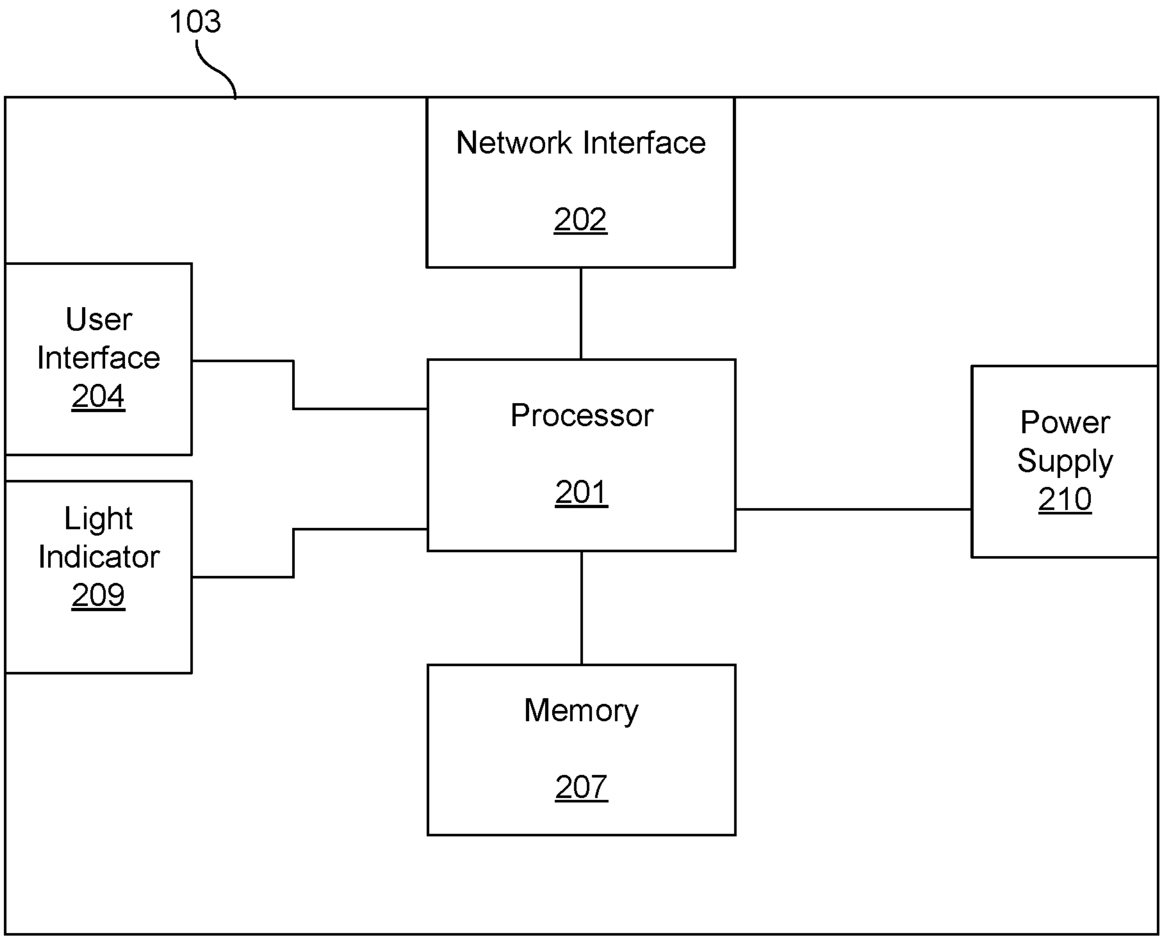

FIG. 2 is an illustrative block diagram of a control device according to an illustrative aspect of the embodiments.

Figure 3:
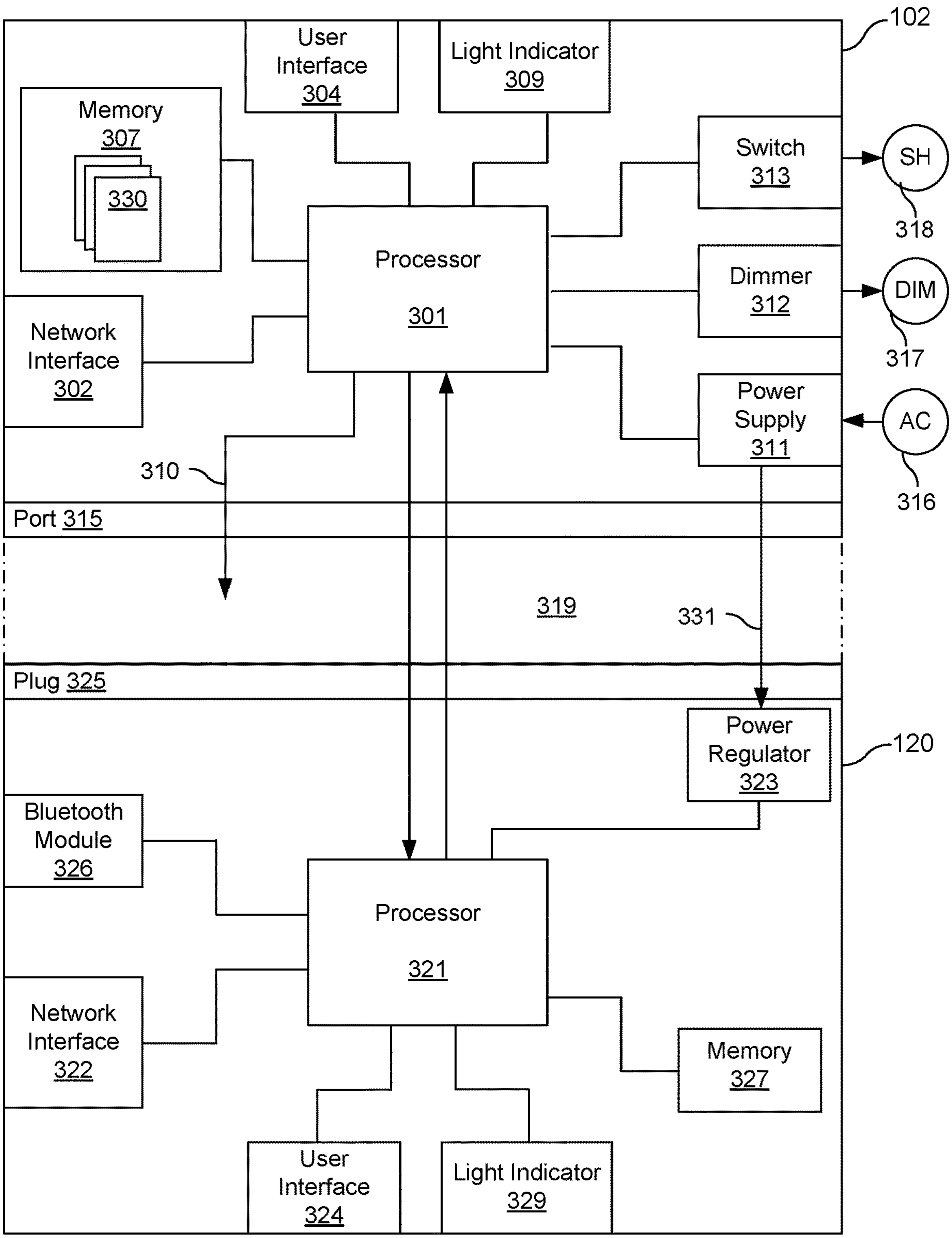

FIG. 3 is an illustrative block diagram of a load controller according to an illustrative aspect of the embodiments.

Figure 4:
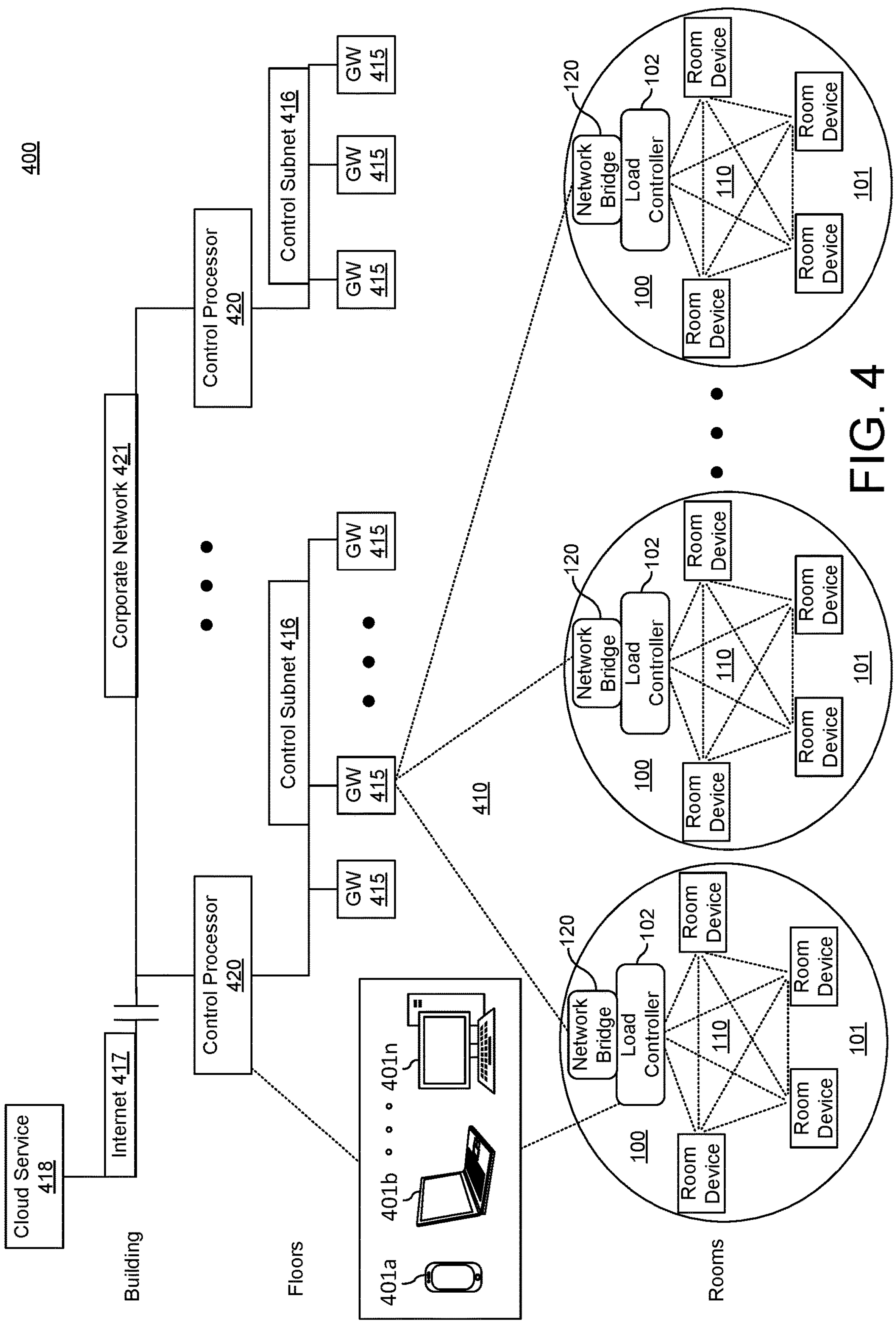

FIG. 4 is an illustrative block diagram of a building control system according to an illustrative aspect of the embodiments.

Figure 5:
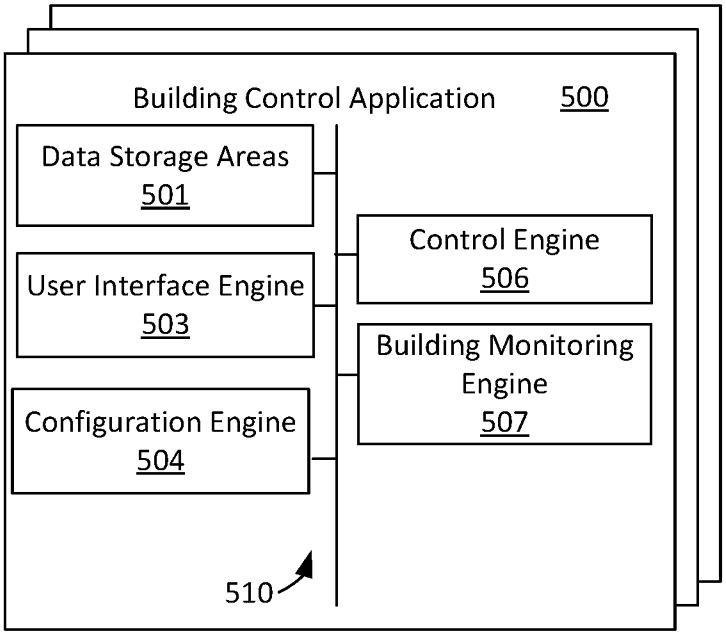

FIG. 5 illustrates a schematic diagram of a building control application according to an embodiment.

Figure 6:
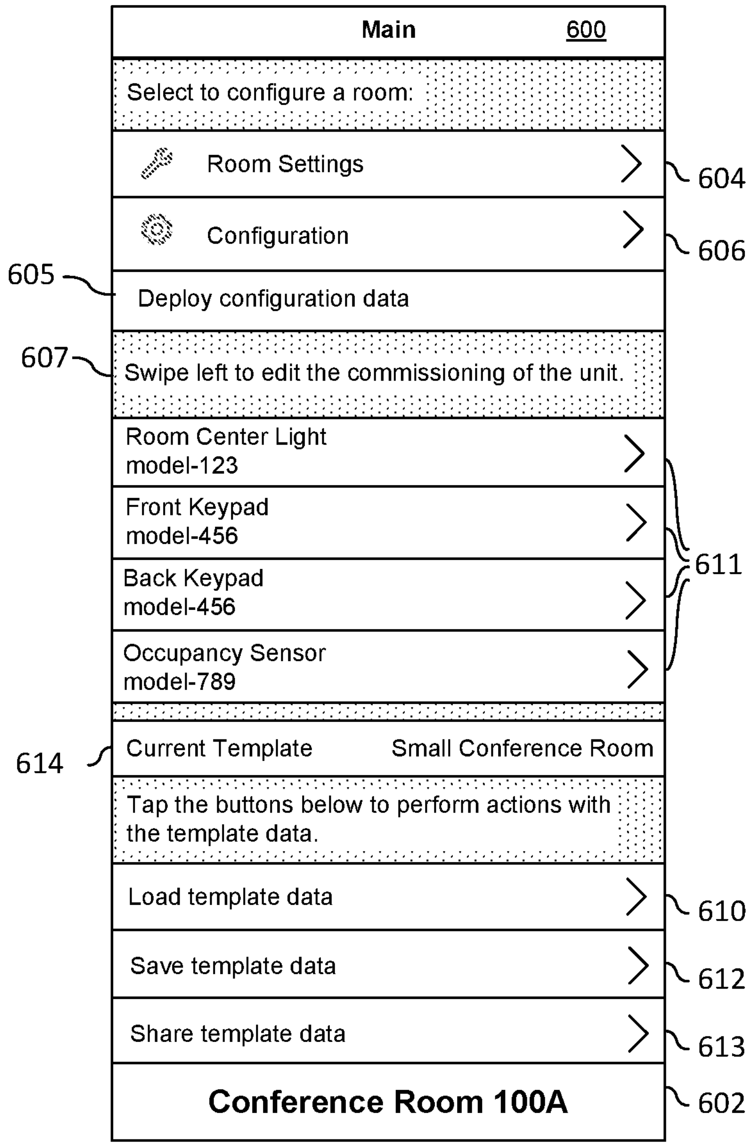

FIG. 6 illustrates a schematic diagram depicting a Main Room page of the building control application according to an embodiment.

Figure 7:
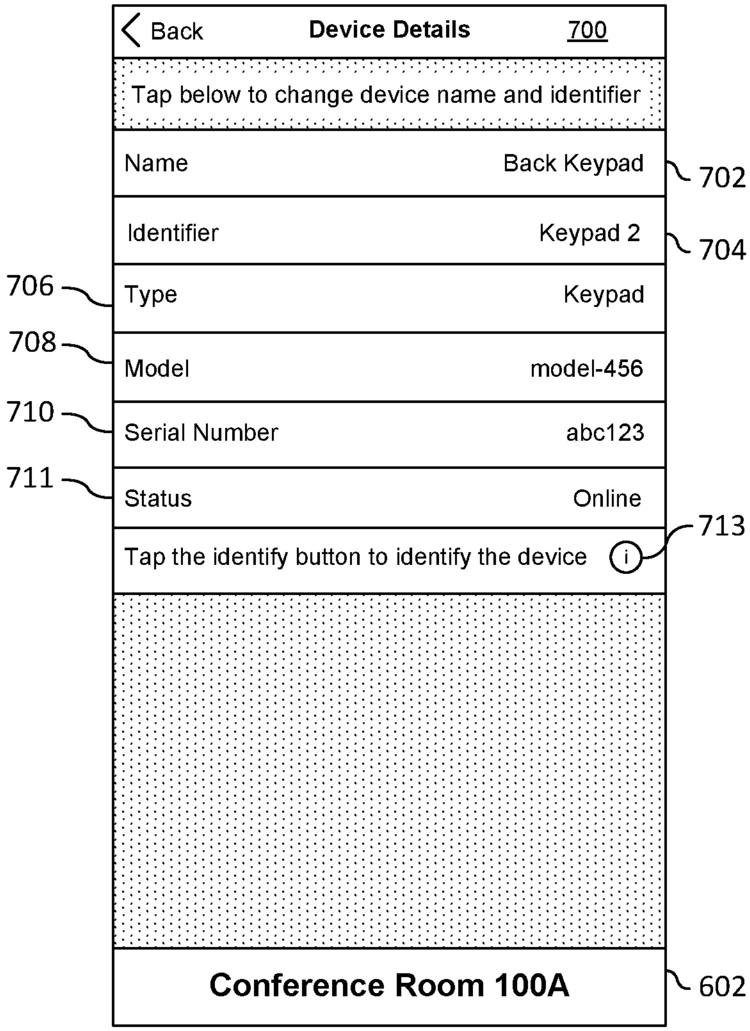

FIG. 7 illustrates a schematic diagram depicting a Device Details page of the building control application according to an embodiment.

Figure 8:
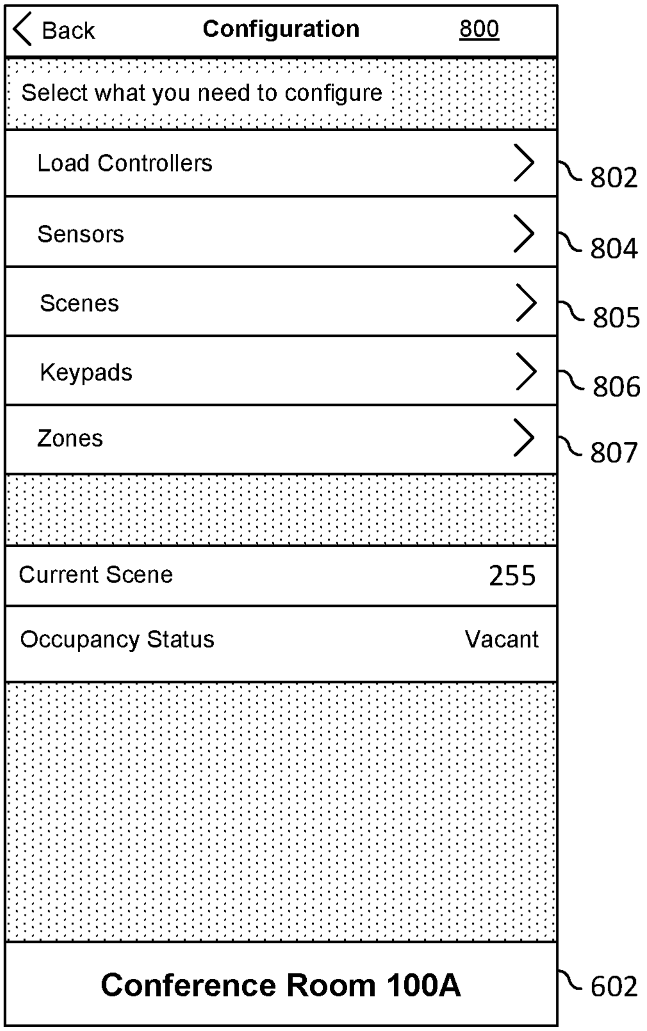

FIG. 8 illustrates a schematic diagram depicting a Configuration page of the building control application according to an embodiment.

Figure 9:
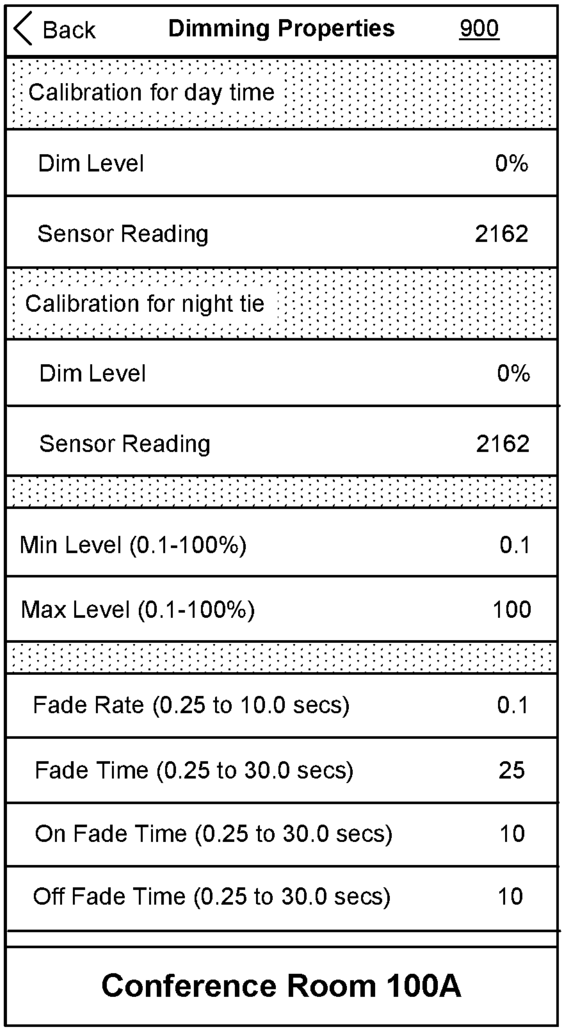

FIG. 9 illustrates a schematic diagram depicting a Dimming Properties page of the building control application according to an embodiment.

Figure 10A:
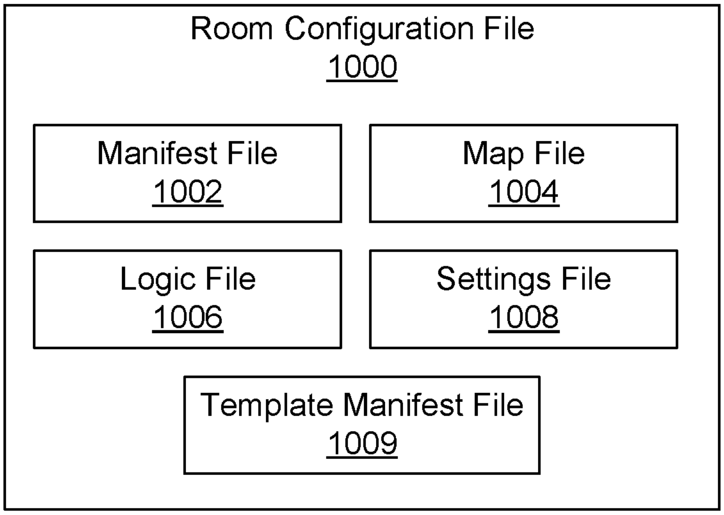

FIG. 10A illustrates a schematic diagram depicting a room configuration file according to an embodiment.

Figure 10B:
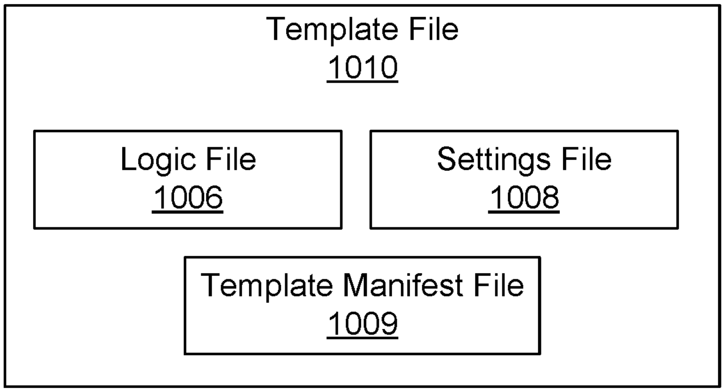

FIG. 10B illustrates a schematic diagram depicting a template file according to an embodiment.

Figure 10C:
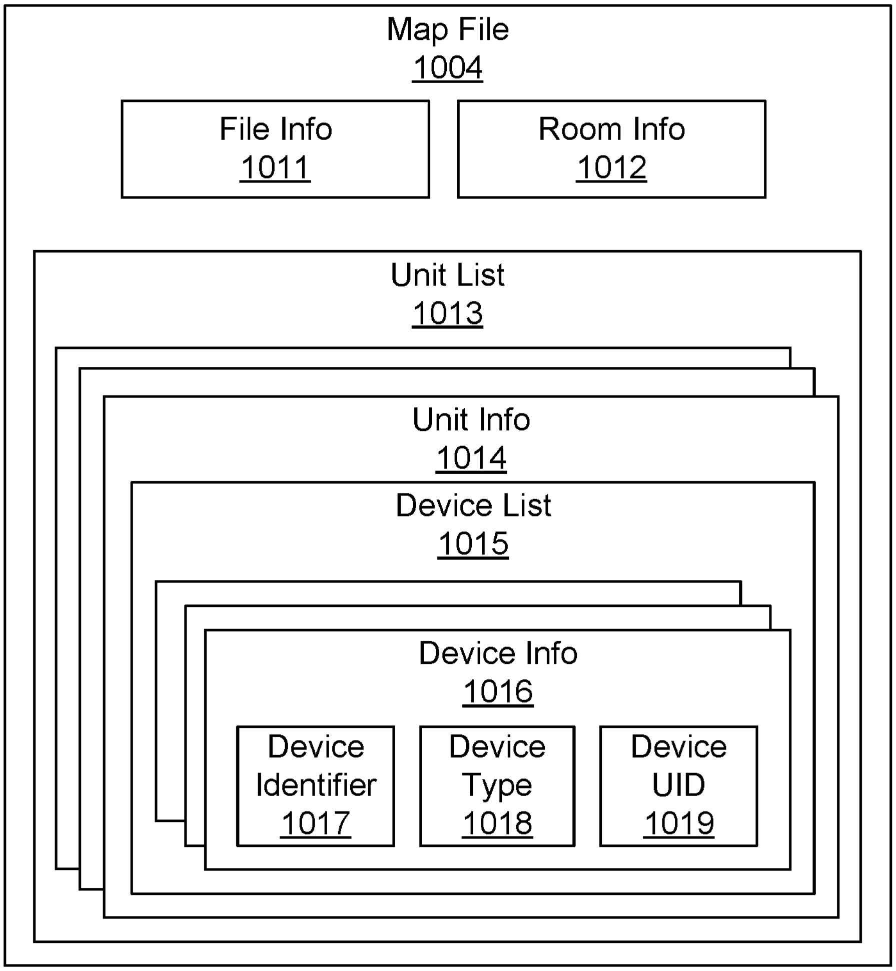

FIG. 10C illustrates a schematic diagram depicting a map file according to an embodiment.

Figure 10D:
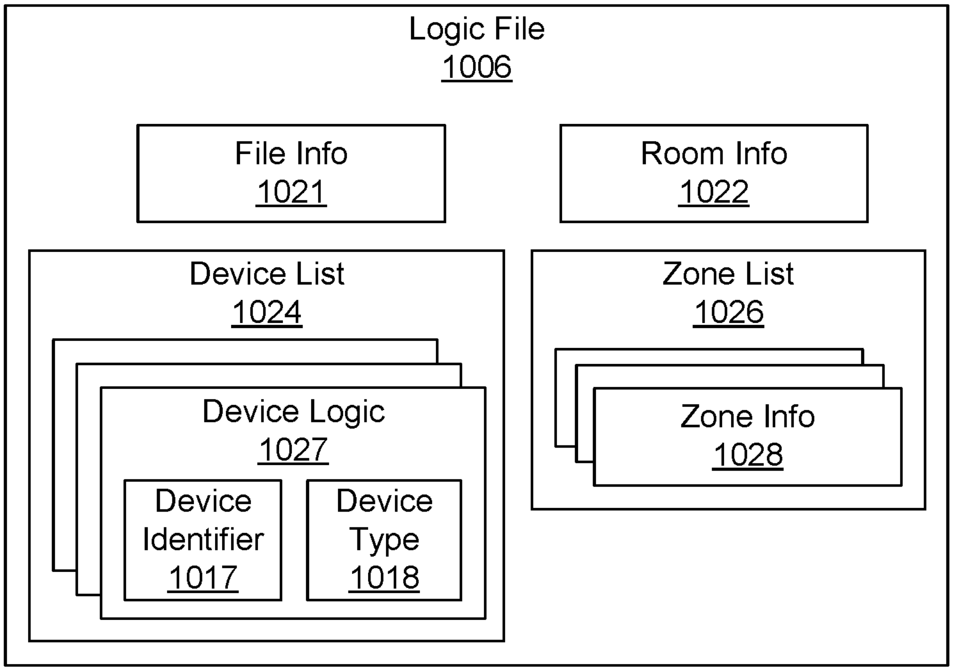

FIG. 10D illustrates a schematic diagram depicting a logic file according to an embodiment.

Figure 10E:
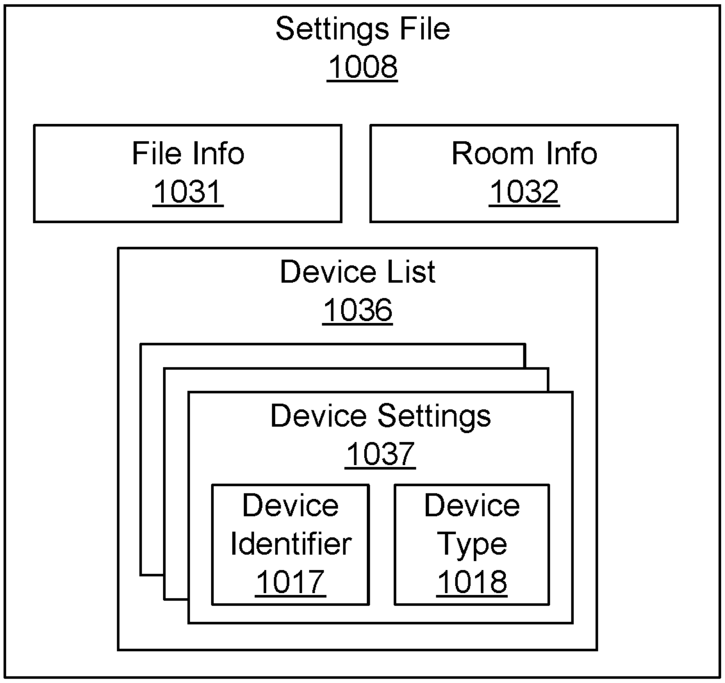

FIG. 10E illustrates a schematic diagram depicting a settings file according to an embodiment.

Figure 11:
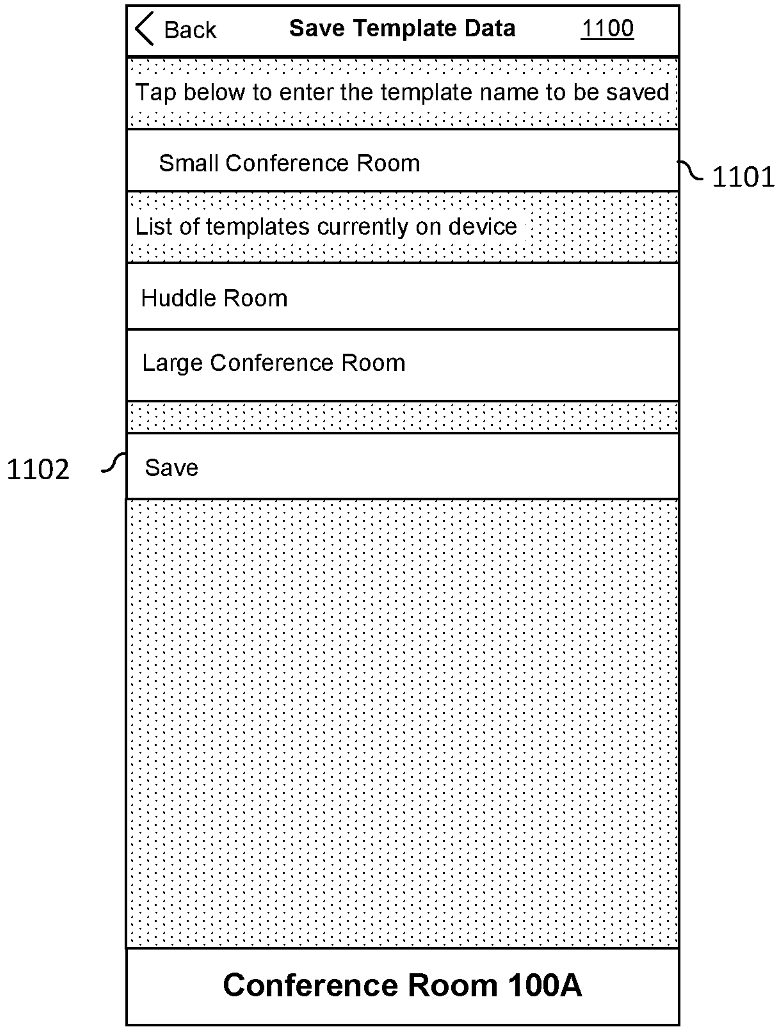

FIG. 11 illustrates a schematic diagram depicting a Save Template Data page of the building control application according to an embodiment.

Figure 12:
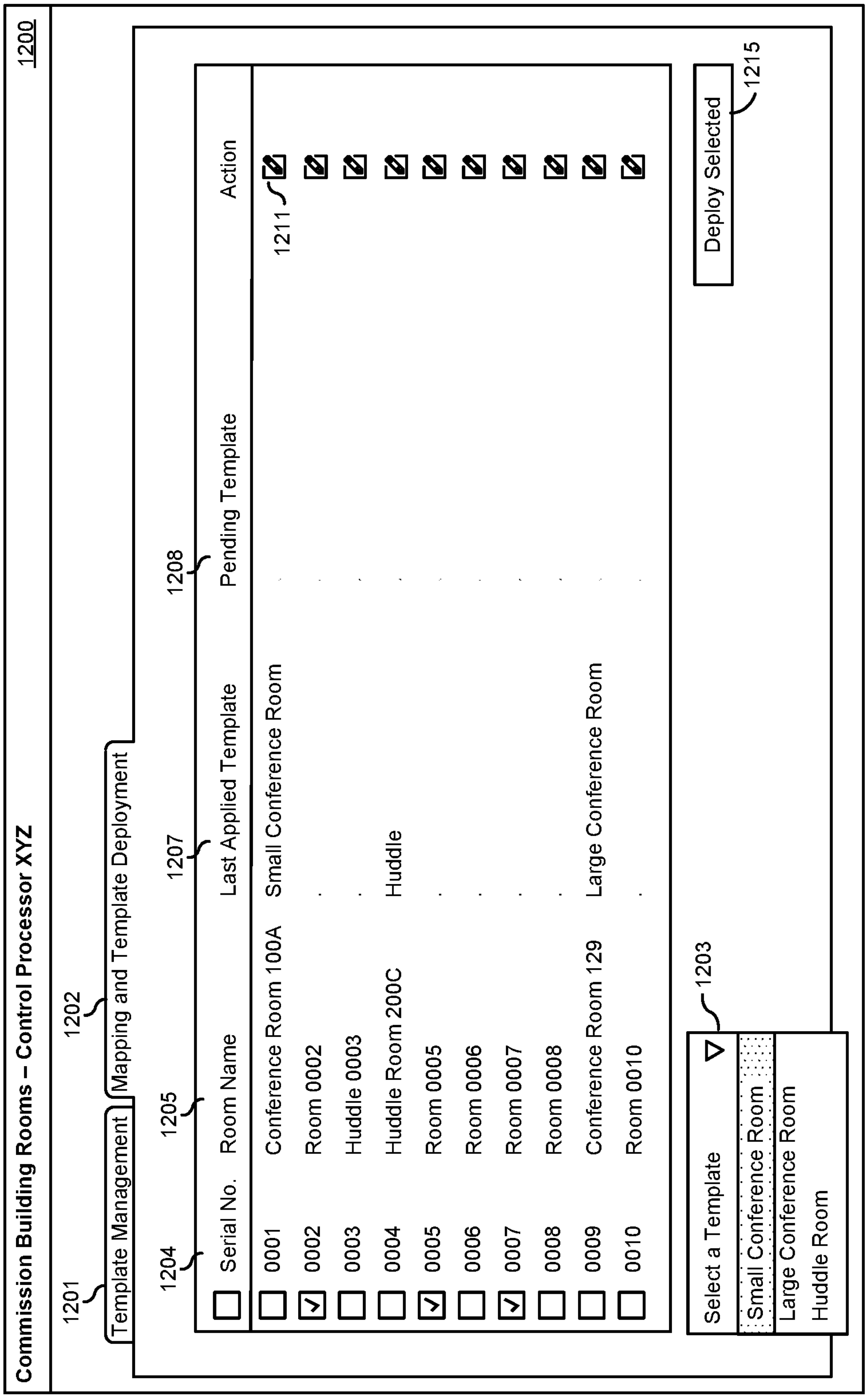

FIG. 12 illustrates a schematic diagram depicting a Mapping and Template Deployment tab of a Commission Building Rooms page of the building control application according to an embodiment.

Figure 13:
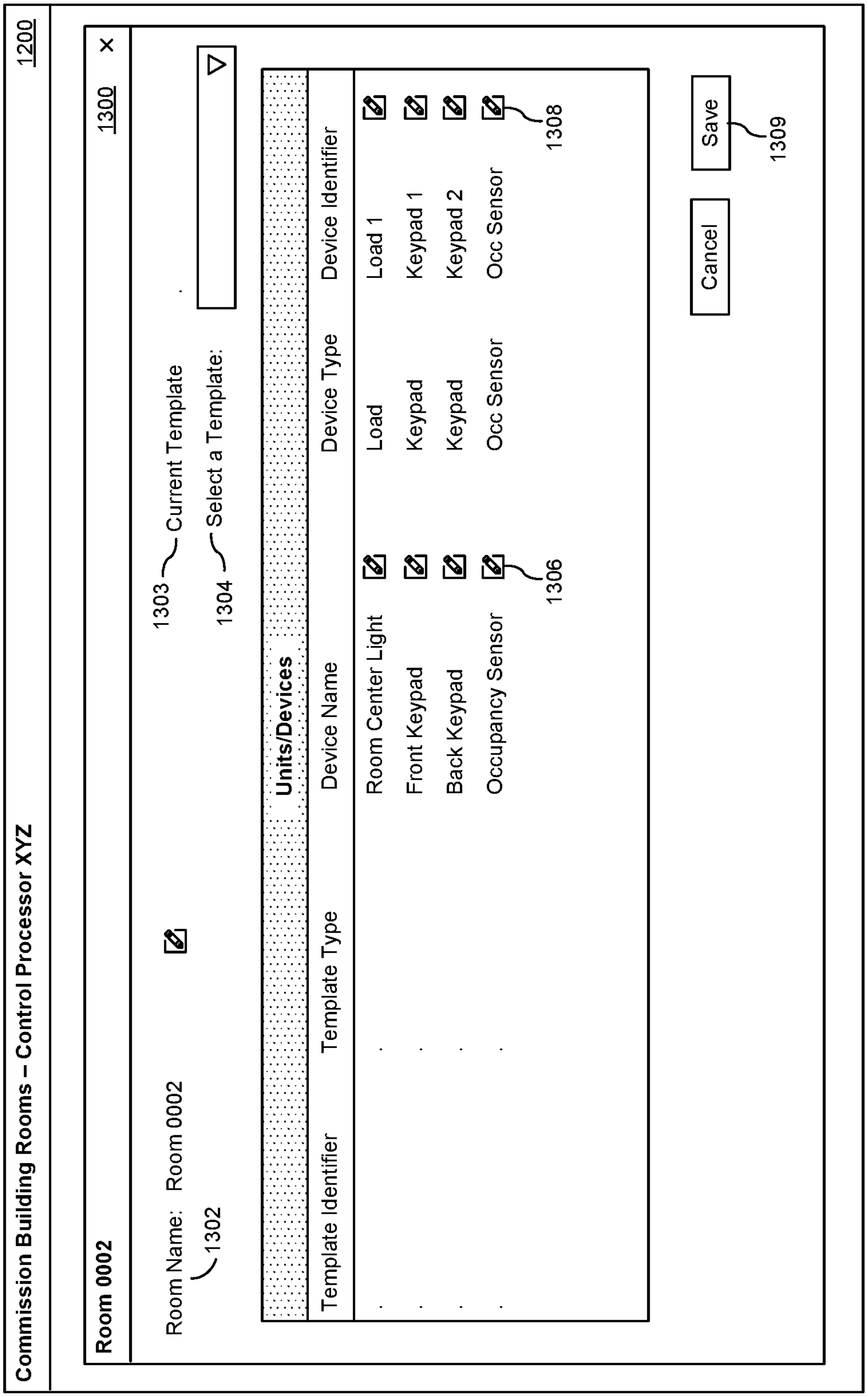

FIG. 13 illustrates a schematic diagram depicting an edit room popup window of the Commission Building Rooms page of the building control application according to an embodiment.

Figure 14:
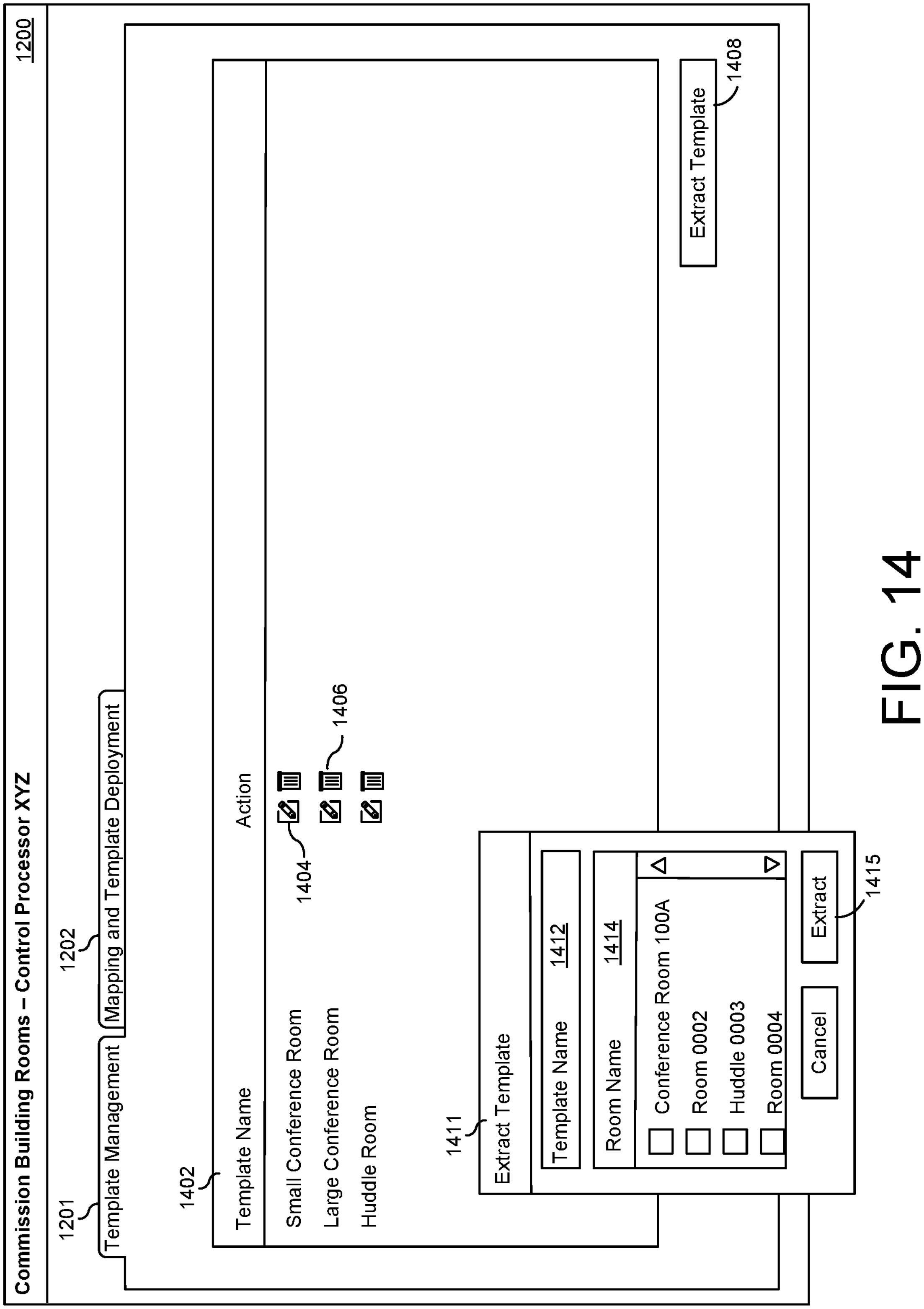

FIG. 14 illustrates a schematic diagram depicting a Template Management tab of the Commission Building Rooms page of the building control application according to an embodiment.

Figure 15:
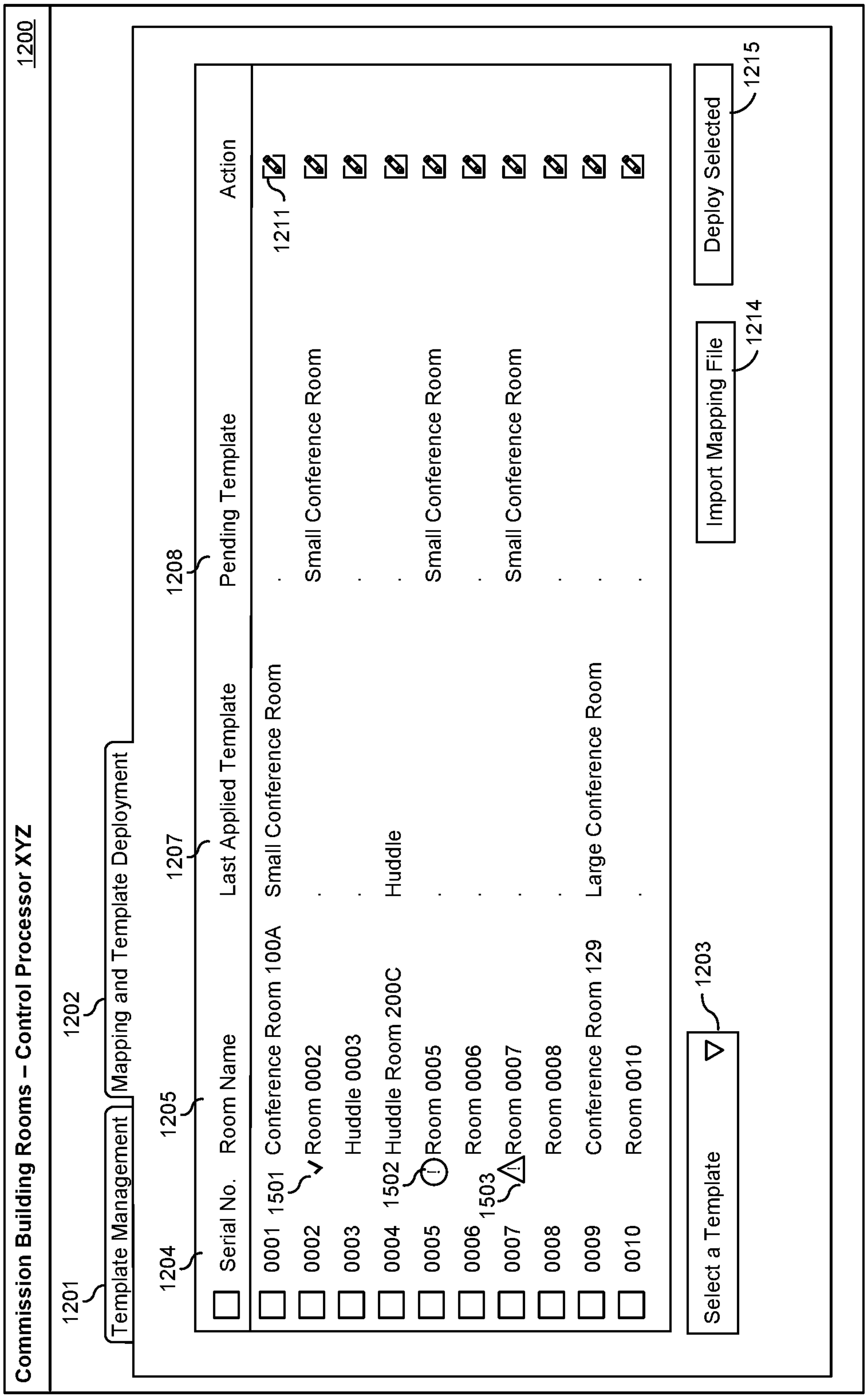

FIG. 15 illustrates a schematic diagram depicting the Mapping and Template Deployment tab of a Commission Building Rooms page of the building control application after applying a template to a plurality of rooms according to an embodiment.

Figure 16:
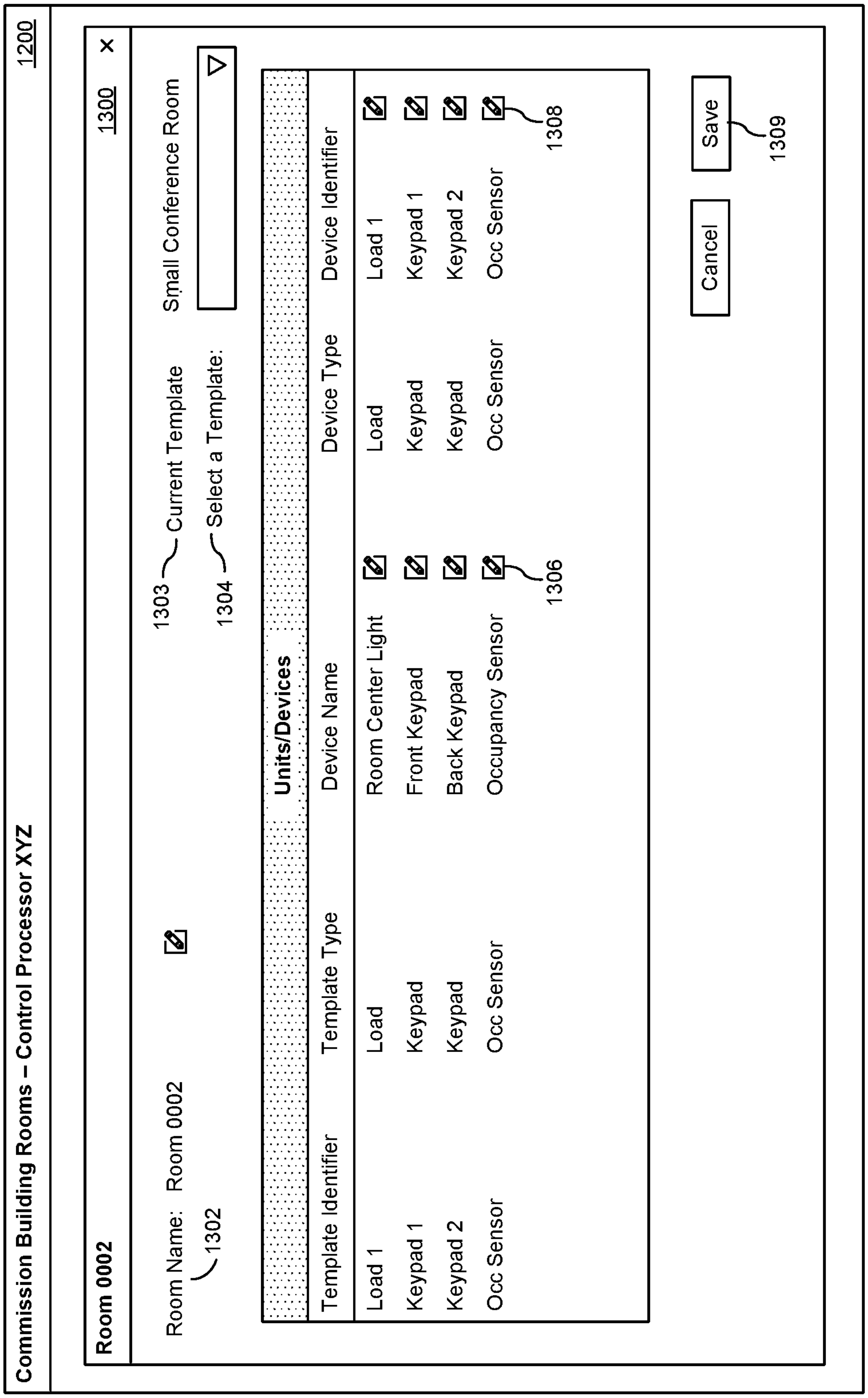

FIG. 16 illustrates a schematic diagram depicting an edit room popup window of the Commission Building Rooms page of the building control application without conflicts after applying a template to a room according to an embodiment.

Figure 17:
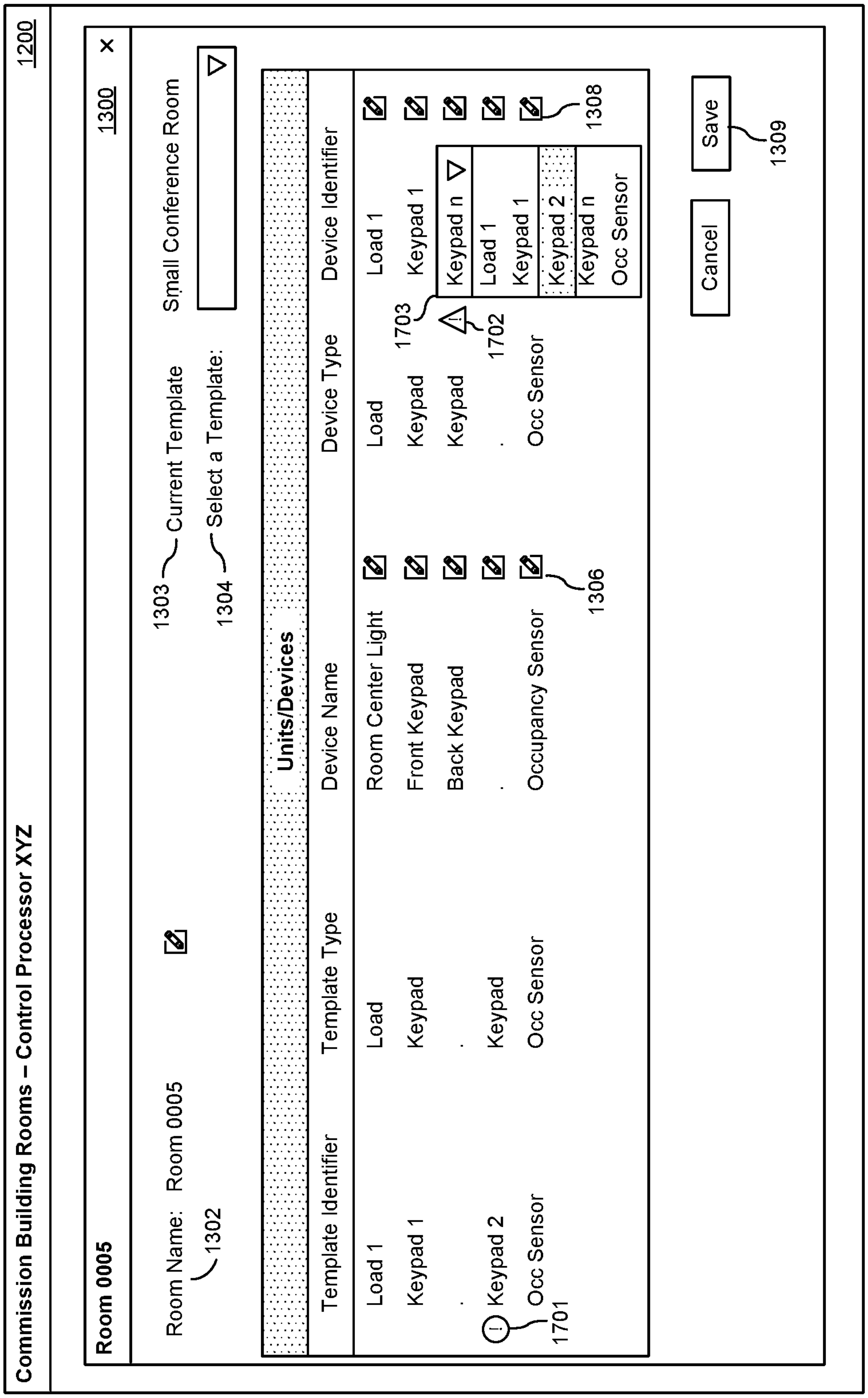

FIG. 17 illustrates a schematic diagram depicting an edit room popup window of the Commission Building Rooms page of the building control application with conflicts after applying a template to a room according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Room Control System(s)
101 Room (s)
102 Load Controller(s)
103 Control Device(s)
104 Occupancy Sensor(s)
105 Light Sensor(s)
106 Lighting Load(s)
107 Buttons
108 Receptacle(s)
109 Light Emitting Diode (LED)
110 Room Network
111 Wire Leads
112 Voltage Line
113 Load Line
115 Junction Box
120 Network Bridge(s)
122 Load Controller
125 Junction Box
201 Processor
202 Network Interface
204 User Interface
207 Memory
209 Light Indicator
210 Power Supply
301 Processor
302 Network Interface
304 User Interface
307 Memory
309 Status Light Indicator
310 General Purpose Input Output (GPIO)
311 Power Supply
312 Dimmer
313 Switch
315 Port
316 Alternating Current (AC) Power
317 Dimmed Voltage Output Signal
318 Switched Hot Signal
319 Bridge Interface
321 Processor
322 Network Interface
323 Power Regulator
324 User Interface
325 Plug
326 Bluetooth Module
327 Memory
329 Status Light Indicator
330 Room Data Files
331 Power

400 Building Control System
401*a-n* User Communication Device(s)
410 Centralized Network
415 Wireless Gateway(s)
416 Control Subnet(s)
417 Internet
418 Cloud Service/Server
420 Control Processor(s)
421 Corporate Network
500 Building Control Application(s)
501 Data Storage Areas
503 User Interface Engine
504 Configuration Engine
506 Control Engine
507 Building Monitoring Engine
510 Software Engines
600 Main Room Page
602 Room Name
604 Room Settings Button
605 Deploy Configuration Data Button
606 Configuration Button
607 Device List
610 Load Template Button
611 Device Buttons
612 Save Current Template Button
613 Share Template Data Button
614 Current Template Field
700 Device Details Page
702 Device Name
704 Device Identifier
706 Device Type
708 Model
710 Serial Number
711 Online Status
713 Identify Button
800 Configuration Page
802 Load Controllers Button
804 Sensors Button
805 Scenes Button
806 Keypads Button
807 Zones Button
900 Dimming Properties Page
1000 Room Configuration File
1002 Manifest File
1004 Map File
1006 Logic File
1008 Settings File
1009 Template Manifest File
1010 Template File
1011 File Info
1012 Room Info
1013 Unit List
1014 Unit Info
1015 Device List(s)
1016 Device Info
1017 Device Identifier
1018 Device Type
1019 Device UID/Serial Number
1021 File Info
1022 Room Info
1024 Device List
1026 Zone List
1027 Device Logic
1028 Zone Info
1031 File Info
1032 Room Info
1036 Device List
1037 Device Settings
1100 Save Template Data Page
1101 Template Name Field
1102 Save Button
1200 Commission Building Rooms Page
1201 Template Management Tab
1202 Mapping and Template Deployment Tab
1203 Select a Template Drop Down Menu
1204 Serial Number Column
1205 Room Name Column
1207 Last Applied Template Column
1208 Pending Template Column
1211 Edit Action Buttons
1215 Deploy Selected Button
1300 Room Edit Popup Window
1302 Room Name Field
1303 Current Template Field
1304 Select a Template Drop Down Menu
1306 Edit Action Button(s)
1308 Edit Action Button(s)
1309 Save Button
1402 Template Name Column
1404 Edit Action Button(s)
1406 Delete Action Button(s)
1408 Extract Template Button
1411 Extract Template Pop-Up Window
1412 Template Name Field
1414 Room Name List
1415 Extract Button
1501 No Conflict Icon
1502 Conflict Icon
1503 Conflict Icon
1701 Conflict Icon
1702 Conflict Icon
1703 Device Identifier Drop Down Menu List of Acronyms Used in the Specification in Alphabetical Order The following is a list of the acronyms used in the specification in alphabetical order.

AC Alternating Current
ASIC Application Specific Integrated Circuit
AV Audiovisual
CCO Contact Closure Output
COM Communication Port
CPU Central Processing Unit
DC Direct Current
GPIO General-Purpose Input/Output
HVAC Heating, Ventilation and Air Conditioning
ID Identification Number
IP Internet Protocol
LAN Local Area Network
LED Light Emitting Diode
PAN Personal Area Network
PC Personal Computer
RAM Random-Access Memory
RF Radio Frequency
RISC Reduced Instruction Set
RJ Registered Jack
ROM Read-Only Memory
SPI Serial Peripheral Interface
UID Unique Identification Number
USB Universal Serial Bus
WPAN Wireless Personal Area Network

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of building control systems, but is not limited thereto, except as may be set forth expressly in the appended claims. The embodiments of the building control system can be used in small, mid, or large scale residential or commercial installations. While the embodiments are described herein as being implemented for commercial building management, they are not limited to such an implementation. The present embodiments may be employed in other type of venues or facilities, including in residential, retail, hospitality, or non-profit structures or venues. Additionally, while the building control system described herein as managing and controlling an entire building, it may be scaled up to manage an entire campus of buildings or scaled down to manage a floor or a section of a floor, such as a department, within a building. Furthermore, while the present embodiments are illustrated primarily with reference to lighting devices and lighting control, this illustration is exemplary and the building control system of the present embodiments can control and monitor numerous electronic devices or equipment, including but not limited to one or more of heating, ventilation and air conditioning (HVAC), lighting, shading, security, appliances, door locks, and audiovisual (AV) equipment, among others.

Referring to FIG. 1, there is shown an exemplary room control system 100 installed within a room according to one embodiment. The room control system 100 may also be deployed in a zone or a space within a building, and may be equally referenced as a space control system. According to an embodiment, the room control system 100 can operate as a room-based, standalone system. As an example, the room control system 100 may comprise one or more of the following devices: one or more load controllers 102 and 122, a control device 103, a receptacle 108, an occupancy sensor 104, and a light sensor 105. The room control system 100 may be installed in an office, classroom, conference room, residential room, or the like. The control system 100 may be configured to control one or more lighting loads 106 as an example, or other types of loads, within room 101 over a room or zone based network 110.

One or more control devices 103 may be installed in room 101. The control device 103 is configured to serve as a user interface to associated load controllers 102 in a space. In an illustrative embodiment, the control device 103 may be configured to receive control commands directly from a user and transmit the control commands to the load controller 102 electrically connected the lighting load 106 to control the lighting load 106 based on the control commands.

The control device 103 may be configured as a switch, a dimmer, a keypad, a control panel, a touch screen, or another type of device configured for receiving control commands from a user. A light switch can be used to control the on/off state of the lighting load 106. A dimmer may be configured to control the on/off state of the lighting load 106 as well as to control a dimming level of the load 106. A keypad, such as the control device 103 illustrated in FIG. 1, may comprise a plurality of buttons 107. The buttons 107 may correspond to different lighting scenes, such as a day scene and a night scene, with different dimming modes that may be preconfigured by the user. The buttons 107 may also be configured to control multiple load devices, such as a plurality of lighting loads 106, as well as other type of loads such as shade or drapery devices, heating, ventilation and air conditioning (HVAC) systems, audiovisual (AV) devices, or the like.

FIG. 2 is an illustrative block diagram of a control device 103. The control device 103 may include various circuit components configured for receiving control commands and transmitting commands to a load controller 102, other in-room devices, or to a control processor (420, FIG. 4). Control device 103 may comprise a power supply 210 configured for providing power to the various circuit components of the control device 103. The control device 103 may be battery operated or it may be powered by an electric alternating current (AC) power from an AC mains power source, or by a direct current (DC) power from a DC power source, via leads, push-in connectors, or the like, suitable for making line voltage connection. The control device 103 may be installed in a standard switch or gang box using screws. According to one embodiment, the control devices 103 may not directly control a lighting load 106, but send control commands to a paired load controller 102 via the room network 110. In other embodiments, one or more control devices 103 may be directly wired and control a load within room 101.

The control device 103 may comprise a user interface 204, such as a touch screen or one or more buttons 107 (FIG. 1) in communication with micro-switches, tactile switches, and/or touch sensors, through which the control device 103 may receive control commands from a user to control an operation of a load, such as turn the load on or off, increase or decrease light levels of the load, recall a preset setting, or the like. These control commands may be transmitted to the load controller 102 over the room network 110 to control its associated lighting load 106. The buttons 107 may be also used to disable or enable operation of the occupancy sensor 104 or the light sensor 105 in the room. The buttons 107 on the control device 103 may be also used for commissioning and configuration purposes, such as to command the control device 103 to join a network, bind the control device 103 to other in-room devices, group the control device 103 into a group of in-room devices, enter into a scene setting mode to configure preset lighting scenes, or the like.

The control device 103 may also comprise at least one status light indicator 209, such as a multicolored light emitting diode (LED) 109 (FIG. 1), configured for visually indicating the status of the control device 103 to the user. For example, if a button 107 is pressed, the light indicator 209 may briefly light green. If the battery level is low (e.g., <5% life remaining) the light indicator 209 may blink red three times. The light indicator 209 may also indicate whether the control device 103 is trying to join a network, when it is configured, or the like. Additional status light indicators may also be provided, for example, to identify active switches or dimming levels.

Each control device 103 can further comprise a processor 201, such as a central processing unit (CPU), one or more microprocessors, "general purpose" microprocessors, combination of general and special purpose microprocessors, application specific integrated circuits (ASICs), reduced instruction set (RISC) processors, video processors, or related chip sets. The processor 201 can provide processing capability to execute an operating system, run various applications, and/or provide processing for one or more of the techniques and functions described herein. Each control device 103 can further include a memory 207 communicably coupled to the processor 201, which can store data and executable code. Memory 207 can represent volatile memory such as random-access memory (RAM), and/or nonvolatile memory, such as read-only memory (ROM) or Flash memory. In buffering or caching data related to operations of the processor 201, memory 207 can store data associated with applications running on the processor 201. Memory 207 can store data files, software for implementing the functions on the processor 201, and network connection information to establish the room network 110. Each control device 103 may comprise a network interface 202, such as a wireless network interface configured for bidirectional wireless communication with other in-room devices, such as the load controller 102, on the wireless room network 110. According to an embodiment, the wireless network interface 202 may comprise a radio frequency (RF) transceiver configured for bidirectional wireless communication over a 2.4 GHz wireless network. Although according to another embodiment, in a wired implementation, network interface 202 may comprise a wired interface.

Referring back to FIG. 1, system 100 may further comprise various sensors, which may output sensor data or control commands to load controllers 102, and thereby the sensors may also be referred to as control devices. For example, system 100 may comprise an occupancy sensor 104 adapted to detect the occupancy state of the room 101 and generate an occupancy signal based on the occupancy state of that monitored area. System 100 may further comprise a light sensor 105 configured for detecting and measuring natural light intensities in the room 101 to enable daylight harvesting applications. Sensors 104-105 may comprise similar components as shown in FIG. 2, including a network interface 202, a processor 201, and a memory 207. Sensors 104-105 may comprise a power supply 210 and may be battery operated or connected to line voltage. Sensors 104-105 may also comprise a user interface 204, such as one or more buttons, configured for commanding the sensors 104-105 to enter into a test mode, battery check, network joining mode, commissioning mode, configuration mode, such as calibration mode, adjusting sensitivity, adjusting timeout, or the like. Sensors 104-105 may further comprise light indicators 209, such as one or more light emitting diodes (LEDs), to display a status of the sensors 104-105. For example, the light indicator 209 may indicate when the sensor is trying to join a network, when it is configured, when motion is detected, when a battery is low, or the like. Sensors 104-105 may contain a plurality of settings that need to be configured by the user for desired operation, including sensitivity settings, the timeout periods, or the like. The room control system 100 may further comprise other types of sensors, such as infrared sensors, photosensors, ultrasonic sensors, various motion sensors, occupancy sensors, proximity sensors, sound sensors, microphones, ambient temperature sensors, or the like.

The control system 100 may further comprise one or more load or zone controllers 102 and 122 installed in the room 101, also sometimes referenced as units herein. Load controller 102 may receive control messages from in-room devices, such as the control device 103, occupancy sensor 104, and light sensor 105, in the room control system 100 to control its associated load, such as lighting load 106. Each load controller 102 may be grouped with particular control devices 103, occupancy sensors 104, and light sensors 105 located within room 101. Each load controller 102 may be mounted to a conventional four-inch junction box 115 in the ceiling via a conduit knockout and may comprise a plurality of wire leads 111 extending into the junction box 115. The load controller 102 may comprise a hot wire and a neutral wire connected via a voltage line 112 to an alternating current (AC) power source, such as an AC mains power source, to receive electric AC power. In an embodiment, the AC power source may comprise 120 Volt (V) 60 Hertz (Hz) AC mains residential power supply. In other embodiments, the AC power source may supply power at a different voltage and/or frequency. For example, in another embodiment, the AC power source may supply 220V 50 Hz AC mains power supply. The load controller 102 may be further connected to a lighting load 106 via load line 113 to control the lighting load 106 in response to messages received from in-room devices, such as the control device 103, occupancy sensor 104, and light sensor 105.

In an alternative embodiment, instead of using a hard wired configuration, the load controller 102 may comprise a plug-in configuration. The load controller 102 may comprise a plug for connection to a wall receptacle to receive electric AC power from an AC power source. Additionally, the load controller 102 may comprise a receptacle for receiving a plug from a lighting load 106.

In various embodiments, a load controller 102 may be connected to control the operation of other types of loads, including other types of lighting devices, including but not limited to lamps, ballasts, light emitting diode (LED) drivers; a power device, including but not limited to a receptacle, a charging device, a power string, or the like; HVAC devices, including but not limited to thermostats, air conditioning units, heating units, filtration systems, fans, humidifiers; shading devices including but not limited to motorized window treatments, dimmable windows; AV devices, including but not limited to content sources, content sinks, video recorders, cameras, VCR, DVD/DVR, CD player, audio receivers, audio system devices, speakers, telephones, video phones, projectors, projector screens, touch panels, cable television box, television such as plasma, liquid crystal display, light-emitting diode flat panel, and cathode ray tube television; security devices, including but not limited to security cameras, monitors and door locks; appliances including but not limited to refrigerators, ovens, blenders, microwaves; lighting control devices, including but not limited to switches, relays, current limiting devices; industrial devices including but not limited to motors, pumps, chillers, and air compressors.

For example, load controller 122, with similar configuration to load controller 102, may be electrically connected to a receptacle 108 via junction box 125 to power the receptacle 108 on or off. Certain building codes require certain percentage of receptacles to be switched off when the room is unoccupied. The load controller 122 connected to the receptacle 108 may turn off power to the receptacle 108 when the room 101 becomes vacant and turn back on when the room 101 becomes occupied, as reported by the occupancy sensor 104. Load controller 122 may transmit its status information to the network manager, such as load controller 102.

FIG. 3 is an illustrative block diagram of a load controller 102 (including load controller 122). The load controller 102 may include various circuit components configured for receiving commands and transmitting commands to various in-room devices, such as other load controllers, the control device 103, occupancy sensor 104, and light sensor 105. The load controller 102 may comprise a power supply 311 connected to the voltage line 112 for receiving an electric AC power 316 from an AC mains power source. The power supply 311 may comprise circuit components configured for converting the incoming AC power to a direct current (DC) power. For example, the power supply 311 may comprise a bridge rectifier that rectifies AC voltage and converts it into a rectified DC voltage. The power supply 311 may also comprise a power regulator configured for maintaining a substantially constant voltage level to stabilize the DC voltage used by the circuit elements of the load controller 102.

The load controller 102 may comprise a user interface 304, such one or more buttons, configured for commanding the load controller 102 to enter into a test mode, a setup mode, or the like. For example, the buttons may be used to command the load controller 102 to form the room network 110 or join an existing room network 110. The load controller 102 may further comprise a status light indicator 309, such as one or more LEDs, for use during setup, maintenance, troubleshooting, or the like. For example, the status light indicator 309 can indicate the current state of the lighting load 106.

The load controller 102 can further comprise a processor 301. Processor 301 can represent one or more microprocessors, "general purpose" microprocessors, a combination of general and special purpose microprocessors, or ASICs. Additionally, or alternatively, the processor 301 can include one or more microcontrollers, RISC processors, video processors, or related chip sets. The processor 301 can provide processing capability to execute an operating system, run various applications, and/or provide processing for one or more of the techniques and functions described herein. Processor 301 can process various commands and perform operations in response to messages received from in-room devices to control the associated load, such as the lighting load 106.

The load controller 102 can further include a memory 307 communicably coupled to the processor 301, which can store data and executable code. Memory 307 can represent volatile memory such as RAM, but can also include non-volatile memory, such as ROM or Flash memory. In buffering or caching data related to operations of the processor 301, the memory 307 can store data associated with applications running on processor 301. Memory 307 can store data files, software for implementing the functions on processor 301, and network connection information to establish the room network 110.

The load controller 102 may further comprise a network interface 302, such as a wireless network interface configured for bidirectional wireless communication with other in-room electronic devices, such as the control devices 103 and light sensors 104, over the wireless room network 110. The wireless network interface 302 may comprise a radio frequency (RF) transceiver configured for bidirectional wireless communication over a 2.4 GHz wireless network. Although according to another embodiment, in a wired implementation, network interface 202 may comprise a wired interface.

The load controller 102 may be a switching load controller comprising a switch 313, such as a relay, configured for switching a connected lighting load 106, or other load type, on or off by providing a switched hot signal 318 to the load. In addition, or alternatively, the load controller 102 may comprise a dimmer 312 configured for providing a dimmed voltage output signal 317 to a connected lighting load 106. For example, the dimmer 312 of the load controller 102 may reduce its output based on sunlight levels reported by the light sensor 104. According to an embodiment, the dimmer 312 may comprise a solid-state dimmer for dimming different types of lighting loads 106, including incandescent, fluorescent, LED, or the like. According to an embodiment, the dimmer 312 may comprise a 0-10V DC dimmer to provide a dimmed voltage output to an LED lighting load, a fluorescent lighting load, or the like.

The load controller 102 may further comprise a port 315, such as a Serial Peripheral Interface (SPI) port, a Universal Serial Bus (USB) port, or the like. According to an embodiment, the port 315 may be used to connect the load controller 102 to other types of systems. The port 315 may comprise a general-purpose input/output (GPIO) generic pin 310. For example, the GPIO pin 310 may be used to connect the load controller 102 to a relay module, such as a Contact Closure Output (CCO) relay module. The relay module may be used to provide control commands to other type of building equipment, such as an HVAC controller. The relay module may provide an optional contact closure interface to inform other system of the state of the room 101, i.e., occupied or vacant. This may be used to enable or disable HVAC in the room. For example, the load controller 102 may drive the relay module on when it receives an occupied state and drive the relay module off when it receives a vacant state based on the reported occupancy sensor state.

In another embodiment, the GPIO pin 310 may be used to connect the load controller 102 to an audiovisual (AV) bridge to enable interactions between an AV system and the room control system 100. The AV bridge may comprise an interface for communication to an AV system, such as an RS-232 serial port. Through the GPIO pin 310 the load controller 102 may provide the state of the room 101, such as its vacancy/occupancy status, light levels, light scenes, or the like, to an AV system. Additionally, the load controller 102 may receive control commands from the AV system, for example, to recall a lighting scene, ignore sensor output for a defined period of time, raise or lower light levels, or the like.

Referring to FIG. 1, the various in-room devices, including the load controllers 102 and 122, control device 103, occupancy sensor 104, and light sensor 105, may intercommunicate with each other using the room network 110 (which also can be referred to as a space network for other types of spaces). In one embodiment, the room network 110 can comprise a wireless network such as a wireless personal area network (WPAN). The wireless room network 110 may comprise a peer-to-peer wireless network, for example, such that sensor 104 on the ceiling can directly communicate with load controller 102 or control device 103. The wireless room network 110 may comprise a 2.4 GHz peer-to-peer radio frequency (RF) mesh network topology, where every in-room device may act as an "expander", relaying wireless commands directly between the in-room devices until the commands reach their intended destination. Each in-room device that is added to the room 101 increases the range and stability of the peer-to-peer mesh network by providing multiple redundant signal paths. According to an embodiment, the wireless range between any two in-room devices in the wireless room network 110 may comprise a range of about 50 ft. According to another embodiment, instead of or in addition to communicating via a wireless network within each room, at least some or all of the various control devices within the room, including load controllers 102 and 122, control devices 103, sensors 104-105, etc., may be wired and communicate via a wired communication network, which may be implemented using bus wiring and serial ports, for example a registered jack (RJ) port, a communication (COM) port, a universal serial bus (USB) port, a Cresnet® port, or the like.

In an embodiment, the room network 110 of the room control system 100 is automatically formed upon installation during a network initialization process. The in-room devices can communicate directly with each other via a pairing process—e.g., tapping buttons on the load controllers 102/122, control device 103, occupancy sensor 104, and light sensor 105 links these devices together to form the in-room network 110. According to an embodiment, each load controller in room 101 may act as a router and can take the role of the network coordinator configured for forming the in-room network 110. In rooms with more than one load controller, one load controller, such as load controller 102, may be assigned to be the network coordinator or master controller. Acting as the network coordinator, the load controller 102 may pick the best channel and select a random personal area network (PAN) identification number (ID) that will be used for message exchange over the room network 110. The load controller 102 will then establish the room network 110 and may then permit the other in-room devices to join the network 110. To join the room based network 110, the other in-room devices can comprise dedicated buttons, or button combinations, configured for commanding the devices to join the network 110. In response, the devices will initiate a network scan to search for best available network. If a network is available and permits devices to join it, the in-room device will perform an association to that network, for example by sending a join request to the network coordinator and receiving a join confirmation message from the network coordinator. According to an embodiment, the in-room device will undergo a security procedure for authentication. If authentication is successful, the in-room device can start acting as an end device. Other load controllers in the room 101, such as load controller 122, may act as routers by routing messages between in-room devices, taking part in re-broadcasting messages, and notifying the network manager in cases of interference detection. Load controllers that are not network managers may discover and synchronize with the network manager and act as trust centers for newly joining devices.

After network formation, the room control system 100 can function as a standalone room based control system within a single room 101 such that the system 100 can respond to sunlight levels, occupancy, button presses, and any integration points through a corresponding load controller 102. The load controller 102 may maintain one or more room data files 330 (FIG. 3) in its memory 307 including information about the discovered in-room devices of the room control system 100 and their configuration. According to an embodiment, the room data files 330 may comprise the configuration file discussed below. After discovering the in-room devices, as well as during the configuration process or during the operation of the room control system 100, each in-room device may report its serial number to uniquely identify itself to the load controller 102. According to another embodiment, each in-room device may be assigned and/or associated with a unique identifier, such as a unique identification number (UID). According to an exemplary embodiment, a UID may comprise a 128-bit number assumed to be unique throughout the entirety of any given system. The load controller 102 may maintain an inventory of the various in-room devices in room 101 according to their unique identifiers, such as UIDs and/or Serial Numbers, in its memory 307. In various aspects of the embodiments, the load controller 102 may further record in the room data files 330 one or more of the following: the RF channel of the room network 110, the number of total in-room devices located in the room 101, the number of loads located in the room 101, and the grouping or binding states of the in-room devices. The load controller 102 may further record attribute data of each in-room device indicating the Device Type, Device Subtype, Model, Serial Number, Device Name, Device Identifier, the type of available device outputs and user inputs or settings it has available, or the like. According to an embodiment, the device's Model, Serial Number, Device Type, and Device Subtype, may be predetermined and may be reported by the devices in the room and cannot be modified by the user. The Device Type specifies the general functionality of the device, for example load controller, photo sensor, occupancy sensor, keypad, or the like. According to an embodiment, the Device Type may be used to represent the capabilities of the device without having to look them up against a list of device's Models, such as all in-room devices have preset capabilities. For example, for a control device 103, the load controller 102 may record that it has an on/off operation, various scene settings, a dimming operation, or the like. The Device Subtype specifies a particular device of a given type, such as the type of load controller, number of keys on a keypad, etc. The Device Name and Device Identifier may be null or entered as default values and are to be modified by the user during commissioning and configuration of the system as discussed below.

During operation, the load controller 102 may keep track of the status of the room 101 as reported by the various in-room devices and record the status in the room data files 330. For example, the load controller 102 may record the status of the load (e.g., on/off and current level that may be expressed as an analog value), daylight status of the room 101 (e.g., illuminance measurement), occupancy status of the room 101 (e.g., occupied/vacant), the operating status of the in-room device (e.g., error, battery level, etc.), or the like. Sleepy devices in room 101 may periodically send check-in messages to the load controller 102 to inform the load controller 102 that the device is still alive and working, inform of its status, battery level, error reporting, or the like. For example, the load controller 102 can keep track of the occupancy and vacancy messages received from each occupancy sensor 104 in an occupancy table and maintain the current state of each occupancy sensor 104 (i.e., occupied or vacant). During operation, in response to receiving a room occupied signal, the load controller 102 may turn the lighting load 106 on. In response to receiving a room vacancy signal from all the occupancy sensors 104 that previously reported a room occupied state, the load controller 102 may turn its respective lighting load 106 off.

The room control system 100 shown in FIG. 1 may be configured to operate as part of a building control system. According to one embodiment, in a wireless network implementation, this may be accomplished via an addition of a network bridge 120. The network bridge 120 connects to the load controller 102 to a building control system to provide an interface for centralized monitoring, management and control of individual room control system 100 throughout a building. Accordingly, each room or space in a building comprising a load controller 102 and a network bridge 120 becomes a node of a building control system. Each network bridge 120 provides a single point of control and reporting for each connected room or space. According to an embodiment, the network bridge 120 adds a second wireless network interface to the load controller 102 to connect the load controller 102 to a separate wireless network, on top of the room network 110. As such, each network bridge 120 in each room provides the ability for multiple room control systems 100 to be monitored and controlled by a building control system, allowing the system to grow exponentially and to be managed centrally.

Referring back to FIG. 3, the network bridge 120 may comprise a plug 325, such as an SPI plug, a USB plug, or the like. Plug 325 of the network bridge 120 is configured for connecting to port 315 of the load controller 102 via a bridge interface 319, such as a bus interface, to provide electrical communication between the network bridge 120 and the load controller 102. The network bridge 120 may further comprise a power regulator 323 configured for maintaining a substantially constant voltage level to stabilize the DC voltage signal used by the circuit elements of the network bridge 120. The network bridge 120 may further comprise a user interface 324 configured for commanding the network bridge 120 to enter into a test mode, a setup mode, a commissioning mode, or the like. The network bridge 120 may further comprise a status light indicator 329 for use during set up, maintenance, and troubleshooting.

The network bridge 120 further comprises a network interface 322 such as a wireless network interface configured for bidirectional wireless communication with a wireless centralized network. The wireless network interface 322 may comprise a radio frequency (RF) transceiver configured for bidirectional wireless communication over a 2.4 GHz wireless network. The network bridge 120 can further comprise a processor 321 (similar to processor 301) that can process various commands and perform operations in response to messages received from the processor 301 of the load controller 102 or from the building wide network through the wireless interface 322. The network bridge 120 can further include a memory 327 (similar to memory 307) communicably coupled to the processor 321, which can store data and executable code for implementing the functions on processor 321.

The network bridge 120 may further comprise a short range communication module, such as a Bluetooth module 326, configured for allowing connection with a user communication device 401*a-n* (FIG. 4), such as a mobile device, a smartphone, a tablet, or the like, as is further discussed below. Although according to an embodiment, the load controller 102 or any other device within a room 101, such as control device 103, may contain a Bluetooth module 326 or similar short range communication module. Although a Bluetooth module 326 is discussed herein for room configuration and commissioning, other methods or means of connecting a user communication device 401*a-n* to an in-room device (120, 102, 103, 104, or 105) may be equally implemented, such as via other RF communication protocols (e.g., NFC, Wi-Fi, or the like) or via a wired connection, such as various USB type connections, Ethernet, or the like.

According to an alternate embodiment, instead of a two unit construction, the network bridge 120 may be integrated with the load controller 102 to form a single unit. In addition, the operation and components of the load controllers 102 or 122 may be integrated within the control devices 103.

Referring to FIG. 4, there is shown an illustrative block diagram of a building control system 400 according to an illustrative aspect of the embodiments. The addition of network bridges 120 to a plurality of rooms 101 allows the plurality of individual room control systems 100 to be monitored and centrally controlled by a building control system 400. The building control system 400 may connect a few room control systems 100, or may be scaled up to connect room control systems 100 of an entire floor, building, campus, or global corporate offices. According to an embodiment, each network bridge 120 connects its corresponding load controller 102 to the building control system 400 over a centralized network 410.

In a wireless implementation, the centralized network 410 may comprise one or more wireless personal area networks (WPANs). Communication protocols may govern the operation of centralized network 410 of the building control system 400 by governing network formation, communication, interferences, and other operational characteristics. A wireless centralized network 410 may comprise a 2-way 2.4 GHz radio frequency mesh network. Every wireless device on a wireless centralized network 410, including the network bridges 120 and wireless gateways 415 may act as an expander to relay wireless commands ensuring every command reaches its intended destination.

According to an embodiment, the room network 110 and the centralized network 410 may operate on different protocols, different power strengths, different channels, different latency, different bandwidth, or the like. According to an embodiment, the room networks 110 may comprise a low latency low bandwidth wireless network configured for real-time communication of data between in-room devices. Accordingly, messages between in-room devices may be transmitted quickly for near immediate control of the room 101. On the other hand, a wireless centralized network 410 may comprise a high latency high bandwidth wireless network configured for transmitting large amount of data over the wireless centralized network 410 to a plurality of rooms 101. Because of the modular architecture of the building control system 400, no real-time behavior is required by the wireless centralized network 410—enabling large amount of data to be transmitted over the wireless centralized network 410 to control the operation of the individual rooms 101 while not effecting the real-time operation of the in-room devices.

The plurality of network bridges 120 get rolled up into the centralized management platform that can run on one or more control processors 420, but could equally be implemented on a personal computer (PC). For example, a building may comprise a plurality of control processors 420, which may also be referred to as floor gateways or floor control hubs, with one or more control processors 420 located on each floor of the building for central floor control. Each control processor 420 may provide a single point of control for a plurality of room control systems 100.

Each control processor 420 may comprise a processor (similar to processor 301), a memory (similar to memory 307), and one or more network interfaces (similar to network interface 302). According to an embodiment, each control processor 420 can further include a wireless network interface configured for communication with one or more network bridges 120 over a wireless centralized network 410 to network, manage, and control a plurality of network bridges 120. According to another embodiment, the control processor 420 may include one or more communication network interfaces configured for communication over a control subnet 416 with one or more intermediate wireless gateway devices 415, which in turn communicate with one or more network bridges 120 over the wireless centralized network 410. The one or more communication network interfaces may be further configured for communication over a building or corporate network 421 and/or the Internet 417. According to an embodiment, the communication network interface may be an Ethernet interface for sending and receiving signals over an Internet Protocol (IP) based network.

The network bridges 120 operate on the wireless centralized network 410 by joining the network 410 and being acquired by the control processors 420 during a wireless network initialization. According to one embodiment, each control processor 420 may comprise a wireless network interface configured for directly connecting the network bridges 120 to the control processor 420 over the wireless centralized network 410. In another embodiment, the wireless centralized network 410 may comprise one or more intermediate devices, such as routers or wireless gateways 415 comprising wireless network interfaces that wirelessly connect to the network bridges 120 via the wireless centralized network 410. Each control processor 420 may be connected to one or more intermediate wireless gateways 415 via a control subnet 416, such as a local area network (LAN). In addition, wireless expanders can be added wherever needed to extend the wireless centralized network 410 by filling-in gaps between devices.

Each network bridge 120 may be configured in a "ready to join network mode" such that as soon as it is connected to and powered by the load controller 102, it will enter an acquire mode. Once a control processor 420 enters an acquire mode, the wireless centralized network 410 may form. To initiate the acquire mode, a commissioning agent may manually interact with the control processor 420 to form the wireless centralized network 410. The control processor 420 may broadcast an invitation message, and network bridges 120 within earshot may connect to the control processor 420. In the instance a network bridge 120 may be within earshot of two gateways 415 or control processors 420, the network bridge 120 may select a "best" gateway 415 or control processor 420 to join, for example based on network quality. As more network bridges 120 join the control processor 420, the control processor 420 may gradually increase the power of the transmitting messages. According to an embodiment, each network bridge 120 may comprise a unique identification number (UID), which it may report to uniquely identify itself to one or more of the control processors 420.

The control processors 420 provide centralized management for all connected rooms 101. Applications that can run on the control processors 420 can include, for example, software for initiating the wireless centralized network 410 and software for managing the operation of connected rooms 101. Each control processor 420 may comprise an astronomical time clock enabling the control processor 420 to schedule automated timed events; although each load controller 102 may also comprise a time clock for implementing automated event scheduling. Each control processor 420 may further aggregate information of all "network enabled" rooms and provide real-time status information to users.

As discussed above, the network bridge 120 may interface with the load controller 102 using a bridge interface 319, such as an SPI bus, a USB bus, or the like. The bridge interface 319 is used as a means to transfer data back and forth between the network bridge 120 and load controller 102. According to an embodiment, once connected, the network bridge 120 may act as a master communication controller for the bridge interface 319 and the load controller may act in a slave mode. However, the load controller 102 may be equipped with a host interrupt line to signal the network bridge 120 of asynchronous communication originated from the load controller 102. Requests or control commands can be initiated from any side (master or slave), however most of the time transactions may be initiated by the master.

Upon connecting to the load controller 102, the network bridge 120 may request the room data files 330, discussed above, including information about all the current in-room devices in room 101 connected to the load controller 102 over the wireless room network 110. The load controller 102 may transmit the room data files 330 as a series of device information frames, one for each reported device. The network bridge 120 may in turn transmit the room data files 330 to the control processor 420 during initiation, periodically, upon a device status change (i.e., room becomes occupied, an error is detected, a battery needs to be replaced, etc.), and/or as requested by the control processor 420. For example, in response to a request from a control processor 420, the network bridge 120 may request the load controller 102 for the last recalled room scene. The last scene may be stored on the load controller 102 in the room data files 330 or can be recalled by the load controller 102 from the control device 103. Accordingly, network bridge 120 aggregates information in the room 101 and exposes it to the control processor 420 as a summarized, higher level, interface to the room 101. According to an embodiment, interface to each room 101 is simplified and abstracted away from the details of what devices are present in the room. For example, no matter what control devices, sensors, or keypads are present in the room 101, the network bridge 120 exposes the same interface to the control processor 420, enabling it to operate at a higher level. The network bridge 120 may further receive various control commands from a control processor 420, for example, to recall a room scene. The room network 110 may also be managed through the control processor 420, for example to remove in-room devices from the room network 110.

The control processors 420 may further provide connection between the network bridges 120 and cloud service or server 418 via a corporate network 421 and/or the Internet 417 for central building control and aggregation of building information. Cloud services 418 may aggregate information from a plurality of control processors 420 into a centralized management and control platform for an entire building or campus. For example, the cloud service 418 may display a floorplan with status information of the building, provide historical data, reporting, notifications, or the like.

According to another embodiment, the centralized network 410 may comprise a wired network adapted for bidirectional wired communication over a wired protocol. For example, a wired centralized network 410 may comprise a local area network (LAN) which may be implemented using bus wiring and serial ports, for example an Ethernet port, a registered jack (RJ) port, a communication (COM) port, a universal serial bus (USB) port, a Cresnet® port, or the like. In such implementation, the load controller 102 or the network bridge 120 may comprise ports adapted to receive cable or wiring connection directly or indirectly to the control processor 420. The wired centralized network 410 may include one or more gateway devices to provide with an entrance to network 410, which may include software and/or hardware components to manage traffic entering and exiting network 410 and conversion between the communication protocols used by various communication devices. In addition, other network embodiments can be deployed with many variations in the number and type of devices, communication networks, communication protocols, system topologies, and myriad other details without departing from the spirit and scope of the present embodiments. The functionality of the network bridge 120 discussed above may be incorporated into the load controller 102. According to yet another embodiment, the building control system 400 may comprise a hybrid of wireless and wired networks. Some rooms 100 may be equipped with wireless load controllers 102 adapted to wirelessly communicate with room devices over a wireless room network 110 and wireless network bridges 120 adapted to wirelessly communicate with the control processors 420 via a wireless centralized network 410. However, other rooms may be alternatively or in addition equipped with wired load controllers 102 adapted to be wired to and communicated with in-room devices over a wired room network 110 and also to be wired to and communicate with the control processors 420 via a wired centralized network 410.

After the building control system 400 is installed in a building, the system 400 needs to get configured and deployed to function according to the system owner's or operator's requirements. The present aspects of the embodiments, allow a user to rapidly configure and deploy configurations to plurality of building control devices within the system 400 via one or more proprietary building control applications or apps. According to one embodiment, a building control application may reside on a user communication device 401*a-n*. The building control application may be further configured for connecting the user communication device 401*a-n*, such as a smartphone 401*a*, to the network bridge 120 via the Bluetooth module 326 or via alternative means as discussed above (or to other devices located within the room 101, such as the load controller 102). The building control application may provide a user interface on the user communication device 401*a-n* allowing a user to commission the room network 110 and configure or setup the in-room devices. For example, with the building control application, installers can set scenes, create scheduled events, and set up sensors. The network bridge 120 may query the load controller 102 for the room data files 330 stored on the memory 307 of the load controller 102 and deliver this information to the building control application via the Bluetooth module 326, which can be used for room monitoring, configuration, and control. The building control application running on the user communication device 401*a-n* is further adapted to communicate with the control processor 420 to transmit and receive information, such as commissioning and configuration data.

According to a further embodiment, a building control application may reside on the control processor 420 and each control processor 420 may provide a web interface allowing users of the system to access the building control application via a webpage and be exposed to all the functionally allowed by the control processor 420, for example to configure devices, time clock events, among other functions. According to an embodiment, the information entered into a building control application running on a user communication device 401*a-n* is transmitted to the control processor 420 and is accessible by the building control application residing on the control processor 420. According to another embodiment, the building control application may reside on a remote server such as cloud service 418 and a user communication device 401*a-n* may be provided with a link to access the remote building control application via website.

User communication devices 401*a-n* may be any computing device known in the art, including, but not limited to a desktop computer, a laptop 401*b*, a portable electronic device, a mobile computer, a smartphone 401*a*, a tablet, a personal digital assistant, or any other computing device configured for running an application and/or communicating with a remote server via a communication network through a web-browser or other similar application. Each user communication device 401*a-n* may comprise a processor, a user interface (e.g., display, keyboard, mouse, or the like), one of numerous forms of storage (e.g., solid-state memory (RAM, ROM, and the like), magnetic memory, such as disc drives, tape storage, and the like, and/or optical memory, such as DVD), and one or more network interfaces, as is known in the art. Using the network interfaces, each user communication device 401*a-n* can communicate with the load controller 102, the control processor 420, or a remote server 418 via a wired or wireless communication network.

Referring to FIG. 5, there is shown a schematic diagram of one or more of the building control applications 500. A building control application 500 may comprise a plurality of software engines 510 adapted to process information received from user communication devices 401*a-n*, load controllers 102, control processors 420, and/or remote databases or servers 418. Depending on implementation, various aspects of the present embodiments may be implemented in a single building control application or a plurality of applications in a single software engine, in a plurality of software engines, or in one or more hardwired components or in a combination of hardwired and software systems. The number and types of applications, software engines, and data storage areas may be varied and, as such, the specific arrangement discussed herein is presented primarily for descriptive purposes.

The one or more software engines 510 may include one or more data storage areas 501 operably associated with the memory and the processor of the computing device running the building control application 500. Data storage areas 501 may be leveraged to maintain data pertinent to the building control application 500. Software engines 510 may comprise a control engine 506 configured to send at least one command to control the load controllers 102. Control commands may comprise on-demand commands generated from user communication devices 401*a-n*. For example, one command may include a command to power on/off or dim a lighting device, control a touch panel, raise/lower the shades, power on/off or adjust the temperature of an HVAC system, enable/disable a security system, power on/off a sensor, power on/off a local computer, or the like. Depending upon implementation, other control commands are contemplated by the present embodiments. A building monitoring engine 507 may be further configured for monitoring the operation of the centralized building control system 400 and providing this information on a user communication device 401*a-n*. Building monitoring engine 507 may be employed to provide real-time or live status information of resources of the building, such as environmental resources and conference room devices. As such, status information may be transmitted to the building monitoring engine 507 on-demand.

Software engines 510 may further comprise a configuration engine 504 configured for allowing a user to preprogram and to deploy setting presets and scenes for each room of the building control system, as will be further described below. The software engines 510 of the building control application 500 may also include a user interface engine 503. The user interface engine 503 may be leveraged in association with one or more included software engines and data available in data storage areas to enable visual layout and presentation structure of the building control application 500. User interface engine 503 may be configured to present the visual layout on user communication devices 401*a-n*. FIGS. 6-17, discussed below, include embodiments of various user interface screens whose presentation and layout may be provided by the user interface engine 504.

A user employs the building control application 500 to configure one or more rooms 101 located within a building. An office building, for example, may contain many similar types of rooms. As an example, it may contain a number of "small conference rooms", "large conference rooms", and "huddle rooms". These types of rooms may contain similar equipment installed therein. For example, a small conference room may contain a single load controller, two lighting control keypads, and an occupancy sensor. A large conference may contain additional devices. According to the aspects of the present embodiments, instead of configuring each room individually and separately, a user can create a template for a particular room type using the building control application 500 and apply such template to similarly situated rooms. Room templates can be created for other types of rooms depending on the building, such as lobbies, hallways, staircases, common areas, conference rooms, private offices, open offices, bathrooms, etc., in a commercial building, or kitchen, living room, bedrooms, bathrooms, etc., in a residential building. A "Room Type" object may be used in the app 500 as a user chosen specification to identify rooms that are substantially identical in equipment and installation and can represent the potential uses for a room. The Room Type object can be extracted from the template name adopted by the user.

Referring to FIG. 6, there is shown an exemplary Main Room page 600 of the building control application 500 for exemplary "Conference Room 100A", according to an embodiment. As an example, the Main Room page 600 may be accessed using the building control application 500 running on the user communication device 401*a-n*, such as a smartphone, after a user carrying the user communication device 401*a-n* has physically entered "Conference Room 100A" and the building control application 500 has discovered and connected to the load controller 102 installed in that room via Bluetooth connection (as discussed above). Although the present embodiment is discussed configuring a room using a building control application 500 running on a user communication device 401*a-n* while the user is present in a room, the room may be equally configured remotely via a building control application 500 running on the control processor 420 or cloud 418. The app 500 may retrieve room data files 330 of the connected room from an external source, including from the load controller 102, the control processor 420, and/or from the cloud service 418. The room data files 330 may contain the room configuration file. If the room has not been configured, the room configuration file will contain default or predefined information. The user may press the Room Settings button 604 to configure or review the room specific data, including to change the Room Name, Room Type, or pin number, configure or review the room's wireless network for a wireless room or configure or review the room's network connection to the control processor 420. The Room Name represents a designation for a specific room that is unique throughout the system 400 and may be uniquely assigned by the user. For example, the user may replace a default Room Name with a chosen Room Name 602 (e.g., "Conference Room 100A") via the Room Settings button 604.

The room configuration file may comprise a Map File (1004, FIG. 10A) that includes information regarding the particular devices discovered as being connected to the load controller 102. The app 500 may display a list 607 of the various devices that are present in the room and which the user may configure. Each device entry may list one or more of the Device Name, Device Identifier, Device Type, Model, Serial Number, and the like. The user may select to configure any of these devices, for example by tapping on any of the device buttons 611 to enter the Device Details page 700 shown in FIG. 7, for example for a keypad with Device Name "Back Keypad". The Device Details page 700 may display the Device Name 702, Device Identifier 704, Device Type 706, Model 708, Serial Number 710, and online status 711 of the device. The Device Name may initially contain a default Device Name. The Device Name can be changed by clicking on the name field 702. Similarly, the user may rename the Device Identifier by clicking on the Device Identifier field 704. The Device Identifier object is used to uniquely reference each device within the context of a Room Type and cannot be the same identifier as another device in the same Room Type. For example, the user may enter "Keypad 2" for Device Identifier of the Back Keypad in the room. The rest of the fields (706, 708, 710 and 711) are predefined and cannot be changed. The user may press the identify button 713 to assist the user with identifying the particular device within the room 101 by flashing a light indicator, such as LED 109, on the device and the load connected to it, if applicable.

Returning to FIG. 6, the user may then select other devices in the room to assign their Device Name and Device Identifier. Next, the user may press the Configuration button 606 to configure the devices in the room. Referring to FIG. 8, there is shown an exemplary Configuration page 800 of the building control application 500 for exemplary "Conference Room 100A", according to an embodiment. Clicking on the Load Controllers button 802, will display a Load Controllers page (not shown) displaying a list of load controllers 102 installed in the room 101. For each load controller 102, the user can view and/or configure applicable settings, such as but not limited to the sensors that are bound to the particular load controller 102, dimming properties, switch parameters, dimming curves, dimming scene configurations, or the like. As an example, referring to FIG. 9, there is shown an exemplary Dimming Properties page 900 where a user may view and configure dimming settings of a selected load controller 102, including viewing its calibration data for day time and night time, and configuring its minimum dimming level, maximum dimming level, fade rate, fade time, on fade time, and off fade time.

Referring back to FIG. 8, clicking on the Sensors button 804 will display a Sensors page (not shown) that will allow a user to view the status of the sensors (e.g., whether the room is occupied or not), and to configure the parameters or settings of the sensors installed in room 101, such as occupancy and photo sensors 104-105, and specify which load controller 104 or load controller zone the sensor is bound to. For example, for an occupancy sensor the user may specify the timeout parameter (the number of seconds that must elapse before the sensor identifies the room as being vacant), and for a photo sensor the user may specify the minimum change in light reading that must occur to trigger an immediate report of the current light level. Configuration of other sensor parameters are also contemplated.

Keypads button 806 will display a Keypad page (not shown) that can allow the user to apply logic to the different buttons of a keypad. For each keypad in the room 101, such as keypad 103, the app 500 may display the keypad name, keypad identified, button layout (number of buttons), tap-tap speed, and hold time. For each button on the keypad, the user can use the button configuration pages to specify which action will be taken based when the button is tapped, double-tapped or held. After selecting the button to be programmed, the user may be shown the keypad button configuration page on which the user can chose which button action they wish to configure, for example, by selecting an applicable scene for each button. Scenes button 805 may allow the user to define particular scenes.

Clicking on the Zones button 807 may display a Zones page that will allow a user to create a zone, input a zone name, specify the Device Types that the zone will contain, and select the collection of devices that are to be member of this particular zone. The above parameters for the in-room devices which may be configured by the user are just exemplary and other parameters or settings can be configured without departing from the scope of the current embodiments.

After finishing configuring the devices installed in room 101, the user may return to the Main page 600 in FIG. 6 and press the Deploy configuration data button 605 which will cause the user communication device 401*a-n* to transmit the room's configuration data to the connected room 101, and namely to the master load controller 102. Room configuration data can be also transmitted to the control processor 420 connected to the configured room and/or to the cloud service 418. Room configuration data can be stored in the form of a room configuration file, which may consist of a collection of files sent to (or retrieved from) a room 101. Referring to FIG. 10A, there is shown a Room Configuration File 1000 comprising of, for example, a Manifest File 1002, a Map File 1004, a Logic File 1006, and a Settings File 1008. Together the data in file 1000 is used to define the operation of the devices with respect to the room 101 and with each other. According to another embodiment, the Logic File 1006 and the Settings File 1008 may be compiled into a single file. The Manifest File 1002 identifies and references the files that makeup the Room Configuration File 1000, including by referencing the Map File 1004, the Logic File 1006, and the Settings File 1008 for a particular room 101. The Room Configuration File 1000 may also contain a Template Manifest File 1009, if it was created for the given room, which is further discussed below.

The Map File 1004 is unique for each room 101 as it describes and identifies the physical devices or units installed in the room 101 and connected to the room's network 110. The Map File 1004 contains data regarding all the hardware components (i.e., units and devices) installed in a particular room 101, details of each of the hardware component, including the Device Identifier, Device Name, Device Type, Model, and a unique identifier that uniquely identifies the hardware components, such as the device's Serial Number, a UID, and the like. Particularly, referring to FIG. 10C, the Map File 1004 may contain the following subparts or subsections: File Info 1011, Room Info 1012, and Unit List 1013. File Info 1011 determines uniqueness and version of the file and may contain a unique identification number (UID) for the Map File 1004 and time stamp representing the time and date when the file was last modified. Room Info 1012 contains information about the room 101 as a whole, including the Room Name, Room Type, and Room UID. Unit List 1013 may contain one or a plurality of Unit Info parts 1014 containing information about each load controller 102 present in the room 101. Each Unit Info part 1014 may include a unique identifier for the unit (load controller) (e.g., Serial Number and/or UID), Unit Identifier, Unit Name, and Device List 1015. Unit Identifier is assigned by the user (similar to the Device Identifier 704 shown in FIG. 7) and is used to uniquely reference each unit within the context of a Room Type. Although load controllers 102 are referenced here as "units" identified by "Unit Identifiers" to differentiate them from devices connected to the load controllers 102, load controllers 102 may be equally referenced as "devices" identified by "Device Identifiers." The Device List 1015 contains information about each of the devices connected to the load controller 102, and for each device it contains Device Info part 1016 containing information about the device, such as the Device Identifier 1017, Device Name (not shown), Device Type 1018, Device Subtype (if any), Model, a unique identifier such as a UID 1019 (which may be instead the serial number of the device), and the like. The Unit/Device Identifier 1017 is used to tie a physical device (identified by a UID 1019) defined in the Map File 1004 to a logical device described in the Logic File 1006 as discussed below. Ideally, installers are aware of the Unit/Device Identifiers 1017 being assigned. One option is for them to install units and devices based upon a list of Unit/Device Identifiers 1017 and Device UIDs 1019. Another is for them to record the UIDs 1019 for each unit on a map of the room so the Unit/Device Identifiers 1017 can be assigned later.

The Logic File 1006 describes the functionality within the room 101 and defines the logical behavior of the devices installed in the room 101 as configured by the user as discussed above. A Logic File 1006 can be shared amongst rooms of the same type that are expected to behave substantially identically using templates as discussed below. Particularly, the Logic File 1006 defines the interactions of the various devices by defining their bindings and configuration or the actions each device needs to perform. Devices in the Logic File 1006 are referenced by their Device Identifiers 1017 such that the Logic File 1006 ties the Device Identifier 1017 to the logic to be executed by such a device. Accordingly, within the Logic File 1006, the Device Identifiers 1017 are used in defining inter-device relationships. Referring to FIG. 10D, the Logic File 1006 can contain a plurality of subparts or subsections, such as File Info 1021, Room Info 1022, Device List 1024, and Zone List 1026. File Info 1021 determines uniqueness and version of the file and may contain a unique identification number (UID) for the Logic File 1006 and time stamp when the file was last updated. Room Info 1022 applies to the room as a whole and may contain information on the Room Name, Room Type, and Room UID. The Device List 1024 contains Device Logic 1027 with information about the devices that comprise the room. Device Logic 1027 may contain the Device Identifier 1017, Device Type, Device Subtype (if any), and the device's specific logic. Since each Device Logic part 1027 within the Logic File 1006 does not uniquely address a device, the file is generic and capable of representing any device that can reside in a room with the same Device Type and identifier as discussed below. Device specific logic defines the inter-device interactions within the room, which may define the input device that can affect the device, input operations, which commands and actions tied to specific keys of a keypad and their operations (press, hold, release, tap, etc.), how inputs should be evaluated, which outputs should be triggered, etc. The Zone List 1026 contains named collection of devices and may contain Zone Info 1028 for each zone. Each Zone Info part 1028 may contain the zone name, zone type, and zone members containing a list of Device Identifiers 1017 of the devices included in that zone. According to an embodiment, when certain Device Types are discovered on the room network 110, the load controller 102 may designate default behavior for them. This default behavior can be written into the Logic File for possible modification later by the user within the app 500.

The Settings File 1008 contains the settings and action parameters for each device in the room as configured by the user as discussed above with reference to FIG. 7. Each setting in the Settings File 1008 is associated with a Device Identifier 1017. Referring to FIG. 10E, the Settings File 1008 can contain a plurality of subparts or subsections, such as File Info 1031, Room Info 1032, and Device List 1036. File Info 1031 determines uniqueness and version of the file and may contain a unique identification number (UID) for the Settings File 1007 and time stamp when the file was last updated. Room Info 1032 contains information on the room as a whole and may contain the Room Type. Device List 1036 may comprise Device Settings 1037 for each device in the Settings File 1008. Device Settings 1037 may contain generic device information capable of representing any device that can reside in the room. Each Device Settings 1037 can comprise a Device Identifier 1017, a Device Type, a Device Subtype (if any), and device specific configuration or parameters. Since each Device Settings 1037 within the Settings File 1008 does not uniquely address a device, the part is generic and capable of representing any device that can reside in a room with the same Device Type and identifier as discussed below. Device specific configuration for each device depend upon the device's Type and Subtype and may comprise initialization values for information that is owned by the devices. Examples include keypad tap time, load controller scene levels, dimmer mode, etc., for example as specified in FIG. 9.

Each file may utilize the following file naming convention:

DataName.DataType.DataHash.EncodingScheme

DataName refers to the user assigned name for the file—for the room configuration files, it would be the Room Name, e.g., "ConferenceRoom100A". DataType represents the type of data in the file, such as configuration, manifest, map, logic, settings, or templatemanifest. DataHash is an identification number for the data to distinguish between different versions of identically named data, for example in the form of a 32-digit hexadecimal number. EncodingScheme is used for system that require the use of file extensions to declare file types, and may comprise for example .zdf extension for the Room Configuration File 1000 and the .json extension for the sub-files, although other extension schemes may be utilized. For example, for Configuration File 1000 for Conference Room 100A, the file name can comprise the following:

"ConferenceRoomA.configuration.11223344556677889900aabbccddeeff.zdf"

Names of files within the Configuration File 1000 will adhere to the same naming convention, and for example may comprise the following names:

"ConferenceRoomA.manifest.fedcbafedcba09876543210987654321.json"

"ConferenceRoomA.map.00112233445566778899aabbccddeeff.json"

"ConferenceRoomA.logic.00998877665544332211ffeeddccbbaa.json"

"ConferenceRoomA.settings.aabbccddeeff11223344556677889900.json"

"ConferenceRoomA.templatemanifest.bbaaccddeeff11223344556677889900.json"

If the user wishes to deploy the same configuration data to another similarly sized room with substantially the same type and number of devices, the user can save the configuration data as a template. Referring to FIG. 6, pressing the Save current template button 612 will open a Save Template Data page 1100 shown in FIG. 11. The user may enter a name for the new template in field 1101, such as for example "Small Conference Room", and press the Save button 1102. This causes a new Template File to be created. Referring to FIG. 10B, a Template File 1010 is created using the data from the Room Configuration File 1000. Namely, the new Template File 1010 comprises the Logic File 1006, the Settings File 1008, and the Template Manifest File 1009. The Template File 1010 can be collected into a .ZIP file, for example. The Template File 1010 does not need to comprise the Map File 1004 as the mapping data is only pertinent to a particular room. The Template Manifest File 1009 defines which Logic and Settings File makes up the template, in this case Logic File 1006 and Settings File 1008. The Template name entered by the user in field 1011 of FIG. 11 is populated in the DataName field of the file name. For example, file name for the Template File 1010 may comprise:

"SmallConferenceRoom.template.d41d8cd98f00b204e9800998ecf8427e.zdf"

The names of files within the Template File 1010 will adhere to the same naming convention. The Template File 1010 is saved by the app 500 on the user communication device 401*a-n*.

After the Template File 1010 is created, the Room Configuration File 1000 may be updated to include the Template Manifest File 1009, which may be sent to the room load controller 102 for informational purposes to identify which Template File 1010 is applicable to that room. In addition, the Room Type object in the Room Configuration File 1000 may be populated with the template name selected by the user for the template. According to an embodiment, the Current Template field 614 on the Main page 600 for the room 101 in FIG. 6 will be updated to display the name of the template that was deployed in that room (if any). Pressing Share template data button 613 allows the user to share the template of the current room. As a result, the Template File 1010 can be transmitted to the building control application 500 running on another user communication device 401*a-n*, the control processor 420 and/or cloud service 418.

After creating the "Small Conference Room" Template, the user can then continue to configure other types of rooms in the same fashion as discussed above. For example, the user can configure and create a "Large Conference Room" Template and a "Huddle" Template. These templates may be transmitted to the control processor 420 and/or cloud service 418. The user communication device 401*a-n*, control processor 420, and/or cloud service 418 may store a plurality of Template Files. According to an embodiment, any given Logic File or Settings File may be referenced by multiple Templates Manifest Files. The contents of the Template Files may be modified using the building control application 500 running on the user communication device 401*a-n*, control processor 420, and/or cloud service 418.

The user then finalizes commissioning the rest of the rooms in the building by completing mapping assignments to develop complete Map Files 1004 for each room 101. The user may physically enter other rooms 101 in the building to update the room settings 604 (FIG. 6), by changing the Room Name 602, Room Type, etc., and device details 700 (FIG. 7) by changing the Device Names via field 702 and Device Identifiers 1017 via field 704. According to an embodiment, the Device Identifiers 1017 specified by the user may be saved in a list such that when the user wishes to change the Device Identifier 1017 using field 704, the user can select a Device Identifier 1017 from the previously saved list or enter a new Device Identifier 1017. According to the present embodiments, for the same Room Types, with substantially the same number and types of devices, the user will select the same Device Identifiers 1017 for same type of devices used for the same purpose. For example, the user may enter "Main Keypad" as the Device Identifier 1017 for each main keypad in each of the small conference rooms. The user, however, does not need to individually configure the devices in these rooms 101.

According to the present embodiment, after creating applicable templates for the building and commissioning the Device Identifiers 1017 in the remainder of the building, the user may automatically deploy the templates to the same room types that have not yet been configured. For example, referring to FIG. 6, the user may select a different room to configure and press the Load template data button 610, which will result in a dialog appearing that lists the various templates that are currently present on the app 500. Selecting one of the templates and will result in the app 500 loading the selected template to the selected room as further discussed below. To apply a template to another room, the room should contain substantially the same number of devices, of the same type, that were installed in a functionally equivalent manner as the devices in the room from which the template was created.

According to another embodiment, after creating the template, the user may access a building control application 500 running on the control processor 420 via a user communication device 401*a-n*, such as a laptop 401*b*. Although this example is illustrated by accessing the building control application 500 running on the control processor 420, the building control application 500 can be accessed via cloud service 418 or the like. Referring to FIG. 12, there is shown a Commission Building Rooms page 1200 of the building control application 500, according to an embodiment. The rooms associated with master load controllers 102 discovered by the control processor 420 may be listed under the mapping and template deployment tab 1202. Each room may be identified by a Room UID 1204 and applicable Room Name 1205. Room Names 1205 may initially display default Room Names if a Room Name was not assigned by the user. The control processor 420 may retrieve the configuration data and configuration state of each room, including the template information, from Room Configuration Files 1000 received from load controllers 102, from its memory, and/or from cloud service 418.

The user may edit the configuration data of any room by pressing on any of the edit action buttons 1211. Referring to FIG. 13, for example for Room 0002, this will bring up a room edit popup window 1300 where a user may view and/or modify the room. Specifically, the user may change the Room Name 1302, view the currently applied template 1303, or select a different template to apply via a drop down menu 1304. The user may also review and edit the individual devices in the room, including reviewing and/or editing the Device Name via edit action buttons 1306 and Device Identifier 1017 via edit action buttons 1308. For example, if the user wishes to apply the Small Conference Room template to Room 0002, the user can confirm that the Device Identifiers 1017 in that room match to the Device Identifiers 1017 (also referenced as Template Identifiers for clarity) used in the Small Conference Room template. Since no template is yet applied to Room 0002 in this example in FIG. 13, the Template Identifier and Template Type data is listed as blank.

The user may manage templates using the Template Management tab 1201, shown in FIG. 14. The Template Management tab 1201 may list any existing templates in the Template Name column 1402. The user can rename or edit existing templates by pressing on the corresponding edit action buttons 1404 or delete existing templates by pressing on the corresponding delete action buttons 1406. If a template was not created, but a room was configured by the user, the user may create a new template by pressing the Extract Template button 1408, which may open an Extract Template pop-up window 1411. The user may enter a desired template name in the Template Name field 1412 and select the room from which to extract the template from the Room Name list 1414, and then press the Extract button 1415. This causes the app 500 to create and save a Template Manifest File 1009 that references the Logic File 1006 and the Settings File 1006 associated with the selected room if these files are stored on the control processor 420. According to another embodiment, the Logic File 1006 and Settings File 1008 may be retrieved from the Room Configuration File 1000 of the load controller 102 associated with the selected room. The newly created template is then saved by the app 500 and is displayed in the available template column 1402.

Returning to FIG. 12, if a room has already been configured, the templates that are applied to the room are listed in the Last Applied Template column 1207. In the shown example, Conference Room 100A, Huddle Room 200C, and Conference Room 129 have already been configured. For example, the "Small Conference Room" template created by the user may be listed under Conference Room 100A. The rest of the rooms have never been configured and therefore the room data related to templates will be blank. According to the present embodiments, instead of commissioning the remainder of the room individually, for rooms that have not been commissioned, the user may load and deploy any existing templates. Available Templates can be stored by the control processor 420 or be downloaded from external locations such as the cloud 418.

For rooms with unassigned templates, the data in the Room Configuration File 1000 may be blank, partially configured, set to default values, or may contain configuration data that the user may wish to change. To assign a template, the user can select one or more rooms and select a template from the Select a Template drop down menu 1203. For example, the user may select Room 0002, Room 0005, and Room 0007 as shown in FIG. 12 and then select the Small Conference Room template from menu 1203 to apply to the selected rooms. The app 500 will load the contents of the Small Conference Room template, including its Logic File 1006, Settings File 1008, and Template Manifest File 1009 and apply it to each room. For each room, the app 500 will retrieve and compare the Map File 1004 of the selected room with the Template File 1010 of the selected template to match devices by Device Types, and within matched Device Types to match devices by Device Identifiers 1017. The Logic File 1006 and Settings File 1008 of the selected rooms are ignored and will be overwritten with the template data as discussed below. If the Map File 1004 of the selected room contains the same number of devices as the Template File 1010 and all of the devices in the Map File 1004 match the devices in the Template File 1010 by both Device Types and Device Identifiers 1017, no conflict exists. If some or all devices do not match by Device Identifiers 1017, there are more devices in the Template File 1010, or there are more devices in the Map File 1004, a conflict will exist. After making the selections, referring to FIG. 15, the selected template will be displayed on the Pending Template column 1208 under the selected Room Name. Any conflicts of applying a Template may be indicated via symbols or icons. For example, icon 1501 may indicate that there are no conflicts, icon 1502 may indicate that there are missing or extra devices in the room that could not be configured with the applied template, and icon 1503 may indicate that there is an issue that needs to be addressed.

The user may access the room edit pop up window of any of the rooms to verify template information or to resolve conflicts. For example, the user may access the room edit popup window of Room 0002 by pressing its corresponding edit action button 1211. Referring to FIG. 16, the selected Small Conference Room template will now appear in the Current Template field 1303. If there are Device Identifiers 1017 (displayed as a "Template Identifiers" in FIG. 16 for clarity) in the Template File 1010 that match to Device Identifiers 1017 in the Map File 1004 of Room 0002, the Template Identifier and Template Type will be populated for that match. As shown, the devices from the Template File 1010 appear next to matched devices from the Map File 1004 of Room 0002. In this example, both the Map File 1004 and the Template File 1010 contained four devices of the same Device Type and with the same Device Identifiers 1017. Accordingly, all devices are matched and there are no conflicts.

If additional Device Identifiers 1017 (or Template Identifiers) exist in the Template File 1010, they would not be displayed next to matched devices in the room, but are shown as additional devices without matched in-room devices. If a Device Identifier 1017 does not match any of the Template Identifiers in the imported Template File 1010, the user can correct the issue by renaming the Device Identifier 1017, for example selecting a Device Identifier 1017 for the room device that matches an unassigned Device Identifier 1017 in the template. The same Device Identifier 1017 cannot be applied by the user for more than one device in the room. Referring to FIG. 17, there is shown an example of a conflict where although there are four devices in each Map File 1004 and Template File 1010 of the same type, there was no match in Device Identifiers 1017 in two of the keypads. Devices with no matches in the Template File 1010 and Map File 1004 may be indicated by conflict icons 1701 and 1702. For example, a keypad with Device Identifier "Keypad 2" in the Template File 1010 was not found in the Map File 1004 since the unmatched keypad in the Map File 1004 was named "Keypad n". The user may resolve the conflict by changing the Device Identifier of "Keypad n" in Map File 1004 to "Keypad 2" using drop down menu 1703 to force the match and click the save button 1309. This will update the Map File 1004 for "Room 0005" with the updated Device Identifier 1017 data. The conflict thereby will resolve. According to an embodiment, the user need not resolve all possible conflicts, and in such cases, the logic and settings data in the Template File 1010 tied to an unmatched Device Identifier 1017 will not apply to any of the devices in the room. It is possible, for example, that the Template File 1010 has more configured devices that are actually present in the room, or vice versa. According to a further embodiment, devices in the Map File 1004 without defined Device Identifiers 1017 or with default Device Identifiers 1017 may be automatically assigned to available Template Identifiers of the same Device Type—a user may reassign these matches by renaming the Device Identifiers 1017. According to an embodiment, once a template is created, the template type and Template Identifier cannot be changed to maintain template data consistent throughout room configuration.

Returning to FIG. 15, once discrepancies are resolved or accepted, the room can be deployed by pressing the Deploy Selected button 1215. In response, the app 500 may create Room Configuration Files 1000 for each deployed room and send these files to load controllers 102 of the respective rooms. The app 500 can deploy Room Configuration Files 1000 to each room one at a time, or it can send them to multiple rooms at the same time. For example, for "Room 0005", the app 500 may create a Room Configuration File 1000 by combining the Map File 1004 for "Room 500" (as was updated by the user) together with the Logic File 1006, Settings File 1008, and Template Manifest File 1009 extracted from the "Small Conference Room" Template File 1010. The Room Configuration File 1000 will further contain the Manifest File 1002 that identifies these files for "Room 500". The Room Configuration File 1000 is transmitted and loaded to the load controller 102 installed in "Room 500" for instant configuration. The transmitted Room Configuration File 1000 will replace any configuration information present on load controller 102. As shown, the Template File 1010 itself is not used within the room—it is its contents that are being transmitted. Beneficially, the Logic File 1006 and the Settings File 1008 extracted from the Template File 1010 are tied to the Map File 1004 using the Device Identifier 1017 such that the load controller 102 can extract the settings of a device from the Settings File 1008, determine the logic of the device from the Logic File 1006 and apply it to a uniquely identified device using the Map File 1004 that contains the Device Identifier 1017 linked to the Device UID 1019. The Template Manifest File 1009 may be sent to the load controller 102 in the room for information purposes, to identify the template that was applied to the room. The screen in FIG. 12 may then be updated to list the templates that were applied to the rooms in the Last Applied Template column 1207, for example, by listing the Small Conference Room template next to Room 0002, Room 0005, and Room 0007. The user may then proceed selecting and deploying templates to the remainder of the rooms in similar fashion as discussed above with reference to FIGS. 12 through 17.

INDUSTRIAL APPLICABILITY

To solve the aforementioned problems, the aspects of the embodiments are directed towards a building control system and method that allow a user to rapidly configure and deploy configurations to plurality of building control devices. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A building control system for configuring and deploying electronic devices installed in a building comprising:

a plurality of space control systems adapted to be installed in spaces located within the building and each comprising:

a plurality of electronic devices; and a load controller adapted to communicate with the plurality of electronic devices via a space network to control an operation of at least one load installed in the space, wherein the load controller stores device data comprising unique identifiers that uniquely identify each of the electronic devices within the building control system;

at least one memory that stores:

a plurality of space templates defining different types of spaces within the building, wherein each space template comprises a plurality of distinct template identifiers, at least one setting associated with each of the template identifiers, and at least one logic defining at least one relationship between at least two template identifiers; and a list of a plurality of distinct device identifiers that distinguish the electronic devices within the space control systems and which match the template identifiers of each of the space templates;

at least one processor that, for at least one space control system:

associates each of the unique identifiers of the plurality of electronic devices with one of the device identifiers;

compares the associated device identifiers with template identifiers of a space template selected from the plurality of space templates; and for each device identifier that matches a template identifier of the selected space template, deploys the at least one setting and the at least one logic associated with the matched template identifier to the respective space control system to control the electronic device associated with the matched device identifier according to the deployed at least one setting and at least one logic.

2. The building control system of claim 1, wherein the at least one processor is further adapted to receive the device data from the load controller.

3. The building control system of claim 1, wherein the at least one processor is further adapted to receive a command to apply the selected space template to the respective space control system.

4. The building control system of claim 3, wherein the command is received from a user interface.

5. The building control system of claim 1, wherein the at least one processor is further adapted to transmit the at least one setting, the at least one logic, and the matched device identifier to the load controller.

6. The building control system of claim 5, wherein the load controller associates the at least one setting and the at least one logic with a unique identifier of an electronic device associated with the matched device identifier.

7. The building control system of claim 1, wherein the at least one processor associates the at least one setting and the at least one logic with a unique identifier of an electronic device associated with the matched device identifier.

8. The building control system of claim 1, wherein the device data further comprises a device type adapted to represent at least one capability of an electronic device, and wherein each space template further comprises a device type associated with each template identifier, and wherein the at least one processor is further adapted to:

compare the device types in the device data with the device types in the selected space template;

wherein the at least one processor compares the device identifiers with template identifiers of the selected space template of only matched device types.

9. The building control system of claim 1, wherein controlling the operation of the at least one load installed in the space changes at least one environmental condition in the building.

10. The building control system of claim 1, wherein the load comprises at least one of a lighting device, a power device, a heating device, a ventilation device, an air conditioning device, a motorized shading device, a security device, an appliance, a door lock, an audiovisual device, an industrial device, and any combinations thereof.

11. The building control system of claim 1, wherein the plurality of electronic devices comprise at least one of a control device, a user interface, a touch screen, a keypad, a switch, a dimmer, a control panel, an occupancy sensor, a light sensor, a relay, and any combinations thereof.

12. The building control system of claim 1, wherein the space network comprises one of a wireless network, a wired network, and any combinations thereof.

13. The building control system of claim 1, wherein the building control system further comprises a central control processor adapted to communicate with the space control systems via a centralized network.

14. The building control system of claim 13, wherein the centralized network comprises one of a wireless network, a wired network, and any combinations thereof.

15. The building control system of claim 1, wherein the at least one processor is further adapted to create a template of the plurality of space templates by retrieving template identifiers and associated settings from one of the space control systems.

16. The building control system of claim 1, wherein the at least one processor is adapted to deploy one or more of the space templates to one or more of the plurality of the space control systems.

17. The building control system of claim 13, wherein the central control processor comprises the at least one processor.

18. The building control system of claim 1, wherein a remote server comprises the at least one processor.

19. The building control system of claim 1, wherein a user communication device comprises the at least one processor and a building control application.

20. The building control system of claim 19, wherein the user communication device is adapted to communicate with at least one of the space control systems and the building control system via the building control application.

21. The building control system of claim 19, wherein the user communication device is adapted to communicate with the load controller via a short range communication.

22. The building control system of claim 1, wherein the at least one setting is selected from at least one of a dimming level, a dimming curve, a timeout period, a lighting scene, a sensor sensitivity setting, an on/off operation, a switch parameter, a calibration data, a fade rate, a fade time, and any combinations thereof.

23. A building control system for configuring and deploying electronic devices installed in a building comprising:

a plurality of space control systems installed in spaces located within the building, each space control system comprising:

a plurality of electronic devices adapted to communicate via a space network to control an operation of at least one load installed in the space, and associated with unique identification numbers that uniquely identify each of the electronic devices within the building control system;

at least one memory that stores:

a plurality of space templates defining different types of spaces within the building, wherein each space template comprises a plurality of distinct template identifiers, at least one setting associated with each of the template identifiers, and at least one logic defining at least one relationship between at least two template identifiers; and a list of a plurality of distinct device identifiers that distinguish the electronic devices within the space control systems and which match the template identifiers of each of the space templates;

at least one processor, wherein for at least one of the space control systems, the at least one processor is adapted to:

associate each of the unique identifiers of the plurality of electronic devices with one of the device identifiers;

compare the associated device identifiers with template identifiers of a space template selected from the plurality of space templates; and for a device identifier that matches a template identifier of the selected space template, deploy the at least one setting and the at least one logic associated with the matched template identifier to the at least one space control system to control the electronic device associated with the matched device identifier according to the deployed at least one setting and at least one logic.

24. A building control system for configuring and deploying electronic devices installed in a building comprising:

a plurality of space control systems installed in spaces located within the building, wherein at least one space control system comprises:

a plurality of electronic devices adapted to communicate via a space network to control at least one load installed in the space;

a memory that stores device data comprising unique identifiers that uniquely identify each of the electronic devices within the building control system and which are associated with respective distinct device identifiers that distinguish the electronic devices within the space control system;

at least one processor adapted to:

assign at least one setting to at least one device identifier of one of the space control systems;

assign at least one logic to at least two device identifiers of the one of the space control systems;

create a space template defining a type of space within the building and comprising the device identifiers and the assigned at least one setting and at least one logic of the one of the space control systems; and apply the space template to another one of the space control systems by applying the at least one setting and the at least one of the logic in the space template to electronic devices with matched device identifiers.

* * * * *